(12) United States Patent
Jernigan et al.

(10) Patent No.: US 7,329,723 B2
(45) Date of Patent: Feb. 12, 2008

(54) THERMAL CRYSTALLIZATION OF POLYESTER PELLETS IN LIQUID

(75) Inventors: Mary Therese Jernigan, Kingsport, TN (US); Michael Paul Ekart, Kingsport, TN (US); Luciano Dalmacio Samitier, Kingsport, TN (US); Cory Lee Wells, Gray, TN (US); Larry Cates Windes, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/665,664

(22) Filed: Sep. 18, 2003

(65) Prior Publication Data
US 2005/0065318 A1    Mar. 24, 2005

(51) Int. Cl.
*B01J 8/00*    (2006.01)
*B01J 8/08*    (2006.01)
*B01J 19/00*   (2006.01)
*B01J 19/24*   (2006.01)
*C08G 63/88*   (2006.01)

(52) U.S. Cl. ............... 528/480; 528/481; 528/499; 528/502 R; 528/503; 422/245.1; 422/261; 422/255

(58) Field of Classification Search ................ 528/480, 528/481, 499, 502, 503, 502 R; 422/245.1, 422/255, 261
See application file for complete search history.

(56) References Cited

U.S. PATENT DOCUMENTS

| | | | |
|---|---|---|---|
| 2,706,722 A | 4/1955 | Caldwell | |
| 3,014,011 A | 12/1961 | Zoetbrood | |
| 3,390,134 A | 6/1968 | Kibler | |
| 3,749,539 A | 7/1973 | Gailbreath et al. | |
| 3,753,637 A | 8/1973 | Gasior et al. | |
| 3,972,852 A | 8/1976 | Inata et al. | |
| 4,123,207 A | 10/1978 | Dudley | |
| 4,251,198 A | 2/1981 | Altenburg | |
| 4,289,874 A | 9/1981 | Bockrath | |
| 4,300,877 A | 11/1981 | Andersen | |
| 4,421,470 A | 12/1983 | Nakamura et al. | |
| 4,470,791 A | 9/1984 | Tanaka et al. | |
| 4,500,271 A | 2/1985 | Smith | |
| 4,554,303 A | 11/1985 | Petke et al. | |
| 4,591,629 A | 5/1986 | El-Ghatta et al. | |
| 4,728,275 A | 3/1988 | DiLullo et al. | |
| 4,728,276 A | 3/1988 | Pauley et al. | |
| 4,822,546 A | 4/1989 | Lohkamp | |
| 5,059,103 A | 10/1991 | Bruckmann et al. | |
| 5,164,478 A | 11/1992 | Lee et al. | |
| 5,187,216 A | 2/1993 | Cassell et al. | |
| 5,241,046 A | 8/1993 | Shiraki et al. | |
| 5,290,913 A | 3/1994 | McAllister et al. | |
| 5,310,515 A | 5/1994 | Jurgen et al. | |
| 5,334,669 A | 8/1994 | Ghisolfi | |
| 5,393,871 A | 2/1995 | Yau et al. | |
| 5,444,144 A | 8/1995 | Tanaka et al. | |
| 5,532,333 A | 7/1996 | Stouffer et al. | |
| 5,532,335 A | 7/1996 | Kimball et al. | |
| 5,540,868 A | 7/1996 | Stouffer et al. | |
| 5,573,820 A | 11/1996 | Harazoe et al. | |
| 5,597,586 A | 1/1997 | Wilson et al. | |
| 5,599,562 A | 2/1997 | Harris et al. | |
| 5,611,983 A | 3/1997 | Ma et al. | |
| 5,628,947 A | 5/1997 | Keilert | |
| 5,663,290 A | 9/1997 | Heise et al. | |
| 5,744,578 A | 4/1998 | Duh | |
| 5,766,533 A | 6/1998 | Mears et al. | |
| 5,895,617 A | 4/1999 | Mizuguchi et al. | |
| 5,942,170 A | 8/1999 | Peitz | |

(Continued)

FOREIGN PATENT DOCUMENTS

CA    2340358    1/2001

(Continued)

OTHER PUBLICATIONS

CONTINUATOR Brochure, Strong Scott Divison of Berwind Process Equipment Company, Predecessor of Hosokawa Bepex Corporation.*

(Continued)

*Primary Examiner*—Irina S. Zemel
(74) *Attorney, Agent, or Firm*—Bernard J. Graves, Jr.; Dennis V. Carmen

(57) ABSTRACT

A process for thermally crystallizing a polyester polymer by introducing pellets into a liquid medium having a temperature of at least 140° C. within a liquid medium zone and crystallizing the submerged pellets at or above the vapor pressure of the liquid medium without increasing the molecular weight of the pellets, and while the pressure on at least a portion of the pellets is equal to or greater than the vapor pressure of the liquid medium, separating at least a portion of said pellets and at least a portion of the liquid medium from each other. The crystallization is desirably conducted in the liquid medium zone without mechanically induced agitation. Optionally, the pellets are formed by an underfluid pelletizer. There is also provided a process for thermally crystallizing solid pellets in a pipe by directing a flow of solid pellets in a liquid medium through a pipe having an aspect ratio L/D of at least 50:1, wherein the solid pellets are crystallized in the pipe at a liquid medium temperature greater than the $T_g$ of the polyester polymer.

21 Claims, 32 Drawing Sheets

U.S. PATENT DOCUMENTS

| | | | |
|---|---|---|---|
| 6,066,713 | A | 5/2000 | Mrose et al. |
| 6,068,910 | A | 5/2000 | Flynn et al. |
| 6,099,778 | A | 8/2000 | Nelson et al. |
| 6,107,445 | A | 8/2000 | Paschke et al. |
| 6,113,997 | A | 9/2000 | Massey et al. |
| 6,129,961 | A | 10/2000 | Sonoda et al. |
| 6,159,406 | A | 12/2000 | Shelby et al. |
| 6,160,085 | A | 12/2000 | Fujimori et al. |
| 6,228,302 | B1 | 5/2001 | Al Ghatta |
| 6,274,656 | B1 | 8/2001 | Ma et al. |
| 6,332,765 | B1 | 12/2001 | Spelleken |
| 6,461,575 | B1 | 10/2002 | Duh et al. |
| 6,474,969 | B1 | 11/2002 | Ready et al. |
| 6,500,915 | B1 | 12/2002 | Fujimori et al. |
| 6,512,078 | B1 | 1/2003 | Gantillon et al. |
| 6,551,087 | B1 | 4/2003 | Martin |
| 6,551,699 | B1 | 4/2003 | Flynn |
| 6,592,350 | B1 | 7/2003 | Chszaniecki |
| 7,033,152 | B2 | 4/2006 | Eloo et al. |
| 2002/0171159 | A1 | 11/2002 | Matthaei et al. |
| 2003/0109640 | A1 | 6/2003 | Lee et al. |
| 2004/0011330 | A1 | 1/2004 | Sauler et al. |

FOREIGN PATENT DOCUMENTS

| | | |
|---|---|---|
| CS | 200745 B | 6/1978 |
| DE | 2347013 A | 3/1975 |
| DE | 3503330 A | 8/1986 |
| DE | 19848245 | 4/2000 |
| DE | 10149474 | 4/2003 |
| DE | 10215344 | 10/2003 |
| DE | 10333648 A1 | 9/2004 |
| EP | 867458 | 9/1998 |
| EP | 0974438 A1 | 1/2000 |
| EP | 0988342 A1 | 3/2000 |
| EP | 0821640 B1 | 6/2000 |
| EP | 1181140 A1 | 2/2002 |
| EP | 0804499 B1 | 7/2002 |
| EP | 0937117 B1 | 1/2003 |
| JP | 53054295 | 5/1978 |
| JP | 56055426 A | 5/1981 |
| JP | 56118420 A | 9/1981 |
| JP | 56147823 A | 11/1981 |
| JP | 59045107 | 9/1982 |
| JP | 5925815 A | 2/1984 |
| JP | 59045106 A | 3/1984 |
| JP | 59219328 A | 12/1984 |
| JP | 60026026 A | 2/1985 |
| JP | 1180309 A | 7/1989 |
| JP | 8073611 | 3/1996 |
| JP | 3095166 | 6/1999 |
| JP | 2000044666 A | 2/2000 |
| JP | 3041851 | 5/2000 |
| JP | 2000143791 | 5/2000 |
| JP | 3075406 | 8/2000 |
| JP | 2001040081 | 2/2001 |
| JP | 2001072753 | 3/2001 |
| JP | 2001072754 | 3/2001 |
| JP | 2001072754 A | 3/2001 |
| JP | 2001079836 | 3/2001 |
| JP | 2001079836 A | 3/2001 |
| JP | 2001081171 A | 3/2001 |
| JP | 2001081174 A | 3/2001 |
| JP | 2001106777 | 4/2001 |
| JP | 2001131277 | 5/2001 |
| JP | 2001247669 | 9/2001 |
| JP | 2001302777 | 10/2001 |
| JP | 2001302778 | 10/2001 |
| JP | 2003181831 | 12/2001 |
| JP | 2002105189 | 4/2002 |
| JP | 2002332340 | 11/2002 |
| JP | 2002338676 | 11/2002 |
| JP | 2003137993 | 5/2003 |
| JP | 2003200420 | 7/2003 |
| JP | 2003206344 | 7/2003 |
| JP | 2003206346 | 7/2003 |
| JP | 2003306537 | 10/2003 |
| JP | 2003306538 | 10/2003 |
| JP | 2003306540 | 10/2003 |
| JP | 2003327680 | 11/2003 |
| JP | 2003342358 | 12/2003 |
| WO | WO92/18554 | 10/1992 |
| WO | WO96/22320 | 7/1996 |
| WO | WO96/33853 | 10/1996 |
| WO | WO97/05186 | 2/1997 |
| WO | WO97/31968 | 9/1997 |
| WO | WO97/42250 | 11/1997 |
| WO | WO99/47605 | 9/1999 |
| WO | WO 200023497 A1 | 4/2000 |
| WO | WO 00/32673 | 6/2000 |
| WO | WO 200032677 | 6/2000 |
| WO | WO 00/46004 | 8/2000 |
| WO | WO 00/64961 | 11/2000 |
| WO | WO 200105566 A1 | 1/2001 |
| WO | WO 01/10622 A1 | 2/2001 |
| WO | WO 200112698 | 2/2001 |
| WO | WO 03/046046 A1 | 6/2003 |
| WO | WO 2004/033174 A1 | 4/2004 |

OTHER PUBLICATIONS

SOLIDAIRE Brochure, Bepex Division of Berwind Corporation, Predecessor of Hosokawa Bepex Corporation.*
U.S. Appl. No. 10/683,522, filed Oct 10, 2003.
Co-pending U.S. Appl. No. 10/986,129 filed Nov. 10, 2004; CIP of U.S. Appl. No. 10/683,522 filed Oct. 10, 2003, ABD.
Office Action dated Jul. 09,2004 from co-pending U.S. Appl. No. 10/683,522 filed Oct. 10, 2003, ABD.
Notice of Allowance/Notice of Allowability from co-pending U.S. Appl. No. 10/683,522 filed Oct. 10, 2003, ABD.
Notice of Allowance/Notice of Allowability from co-pending U.S. Appl. No. 10/986,129 filed Nov. 10, 2004.
Office Action dated Mar. 10, 2006 from co-pending U.S. Appl. No. 10/986,129 filed Nov. 10, 2004.
Office Action dated Sep. 22, 2006 from co-pending U.S. Appl. No. 10/986,129 filed Nov. 10, 2004.
Notice of Allowance/Notice of Allowability dated Nov. 9, 2006, from co-pending U.S. Appl. No. 10/986,129 filed Nov. 10, 2004.
Supplemental Notice of Allowability dated Dec. 21, 2006 co-pending U.S. Appl. No. 10/986,129 filed Nov. 10, 2004.
International Search Report.
Co-pending U.S. Appl. No. 11/700,450 filed Jan. 31, 2007.
Co-pending U.S. Appl. No. 11/888,255 filed Jul. 31, 2007.

* cited by examiner

THERMAL CRYSTALLIZATION OF POLYESTER PELLETS IN LIQUID

1. FIELD OF THE INVENTION

The invention pertains to the crystallization of polyester pellets, and more particularly to the crystallization of polyester pellets in a liquid medium.

2. BACKGROUND OF THE INVENTION

Polyester (or copolyester) pellets are generally supplied to converters in a semi-crystalline form. Converters desire to process semi-crystalline pellets rather than amorphous pellets because the semi-crystalline pellets can be dried at higher temperatures without agglomerating. Drying the pellets immediately prior to extrusion of the melt to make bottle performs is necessary to prevent hydrolytic degradation and loss of intrinsic viscosity (It.V.) of the melt inside the extruder. However, drying amorphous polyester pellets at or above the $T_g$ of PET without first crystallizing the pellets will cause the pellets to agglomerate at higher temperatures (140° C. to 180° C.) in the dryers. Feeding amorphous pellets to an extruder will cause the screw to be wrapped as the pellets become hot enough to crystallize in the extrusion zone.

From the pellet manufacturing side, a typical commercial process involves forming the polyester polymer via melt phase polymerizing up to an It.V. ranging from about 0.5 to 0.70, extruding the melt into strands, quenching the strands, cutting the cooled polymer strands into solid amorphous pellets, heating the solid pellets to above their $T_g$ and then crystallizing (also known as crystallization from the glass since the pellets to be crystallized start at a temperature below their $T_g$), and then heating the pellets in the solid state to an even higher temperature while under nitrogen purge (or vacuum) in order to continue to build molecular weight or It.V. (i.e. solid stating). The solid stating process runs hot enough to make it necessary to first crystallize the pellets to prevent agglomeration at the solid stating temperatures. Thus, crystallization is necessary to avoid agglomeration of the pellets during solid stating and during the drying step prior to extruding the melt into bottle performs.

Typical melt phase polyester reactors produce only amorphous pellets. To make these pellets crystalline, they are usually heated to elevated temperatures in a crystallization vessel while being constantly stirred using paddles or other mechanical rotary mixing means in order to prevent sticking or clumping in the crystallization vessel. The crystallizer is nothing more that a heated vessel with a series of paddles or agitator blades to keep the pellets stirred (e.g. a Hosokawa Bepex Horizontal Paddle Dryer). Rotary mixing means suffer the disadvantage of requiring additional energy for mechanical rotational movement, and rotational mechanical agitation required to keep the pellets from sticking can also cause chipping and other damage to the pellets, leading to dust generation or the presence of "fines" in the crystallizer and product.

Alternately, a crystallizer can consist of injecting hot gas into a vessel known as a hot, fluidized bed, mostly containing already crystallized pellets which prevents the amorphous pellets being fed to the vessel from sticking to each other (e.g. a Buhler precrystallizer). Such commercial processes utilize the "thermal" crystallization technique by employing a hot gas, such as steam, air, or nitrogen as the heating medium. The residence time in hot fluidized bed processes is up to six hours. These processes also suffer the disadvantage in that large quantities of gas are required, requiring large blowers and making the processes energy intensive.

Each of these crystallization processes is rather slow and energy-intensive. Crystallization processes can take up to six hours, require energy to turn mechanical rotary mixing means in some cases, and have high energy requirements to process hot gases or oil. In all cases, the conventional crystallization techniques require the use of large vessels to accommodate large quantities of pellets and crystallize within a reasonable residence time. Moreover, typical crystallization vessels are fed with low It.V. pellets suitable for solid stating into higher It.V. pellets which are required for making a suitable bottle. It would be desirable to crystallize polyester pellets in a more energy efficient manner or in lower cost equipment or both. For example, it would be desirable to reduce the residence time of pellets in the crystallizer, or provide a process which avoids the energy requirements and fines generation of mechanical rotary mixing means, or to reduce equipment costs or simplify the equipment design, or which even could avoid the step of solid stating altogether, while providing to the converter a high temperature crystallized pellet to enable the converter to dry the pellets at conventional temperatures (typically at 140° C. to 180° C.) at typical residence times (about 0.75 to 6 hours) Obtaining any one of these advantages would be desirable.

3. SUMMARY OF THE INVENTION

There is now provided a process for thermally crystallizing a polyester polymer comprising:
  a2) introducing solid amorphous pellets into a liquid medium having a temperature of at least 140° C. within a liquid medium zone within a crystallization vessel and crystallizing said solid amorphous pellets in the liquid medium at a pressure within said zone at or above the vapor pressure of the liquid medium at the liquid medium temperature without increasing the molecular weight of the pellets; and
  b) while the pressure on at least a portion of the pellets is equal to or greater than the vapor pressure of the liquid medium, separating at least a portion of said pellets and at least a portion of the liquid medium from each other.

In another embodiment of the invention, the above crystallization is conducted in the liquid medium zone without mechanically induced agitation.

In yet a further embodiment, there is provided a process for thermally crystallizing a polyester polymer comprising:
  a1) forming solid amorphous pellets comprising underfluid pelletizing with a pelletizer, and
  a2) introducing the solid amorphous pellets into a liquid medium having a temperature of at least 140° C. within a liquid medium zone within a crystallization vessel and crystallizing said solid amorphous pellets in the liquid medium at a pressure within said zone at or above the vapor pressure of the liquid medium at the liquid medium temperature without increasing the molecular weight of the pellets.

There is also provided a method for making a preform from pellets comprising:
  c) drying non-solid stated PET pellets having an It.V. ranging from 0.7 to 1.15 in a drying zone at a zone temperature of at least 140° C.;
  d) introducing the dried pellets into an extrusion zone to form molten PET polymer; and e) forming a molded part such as a bottle perform from the extruded molten PET polymer.

Moreover, the is also now provided a process for thermally crystallizing solid pellets in a pipe comprising directing a flow of solid pellets in a liquid medium through a pipe having an aspect ratio L/D of at least 15:1, wherein the solid pellets are crystallized in the pipe at a liquid medium temperature greater than the $T_g$ of the polyester polymer.

In each of these processes, at least one or more of the following advantages are realized: Crystallization proceeds rapidly, mechanical rotary mixers are not necessary, the processes are energy efficient because of the high thermal transfer rate to pellets under a hot fluid, equipment costs are reduced and/or the design is simplified, solid stating may be avoided if desired, and/or a converter is provided with high It.V. crystallized pellet to dry at conventional temperatures without agglomeration.

4. BRIEF DESCRIPTION OF THE DRAWINGS

Figure 14:
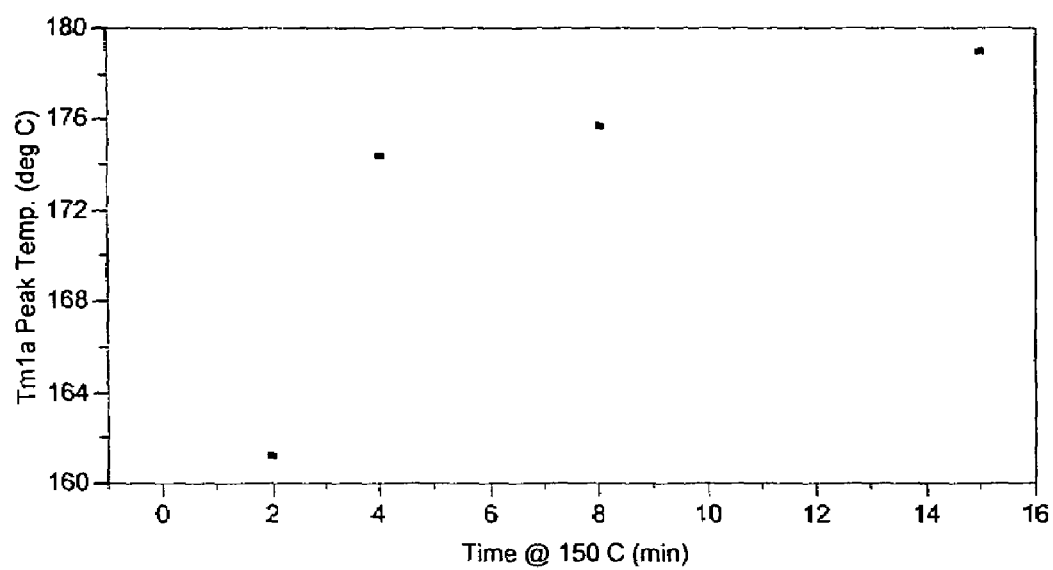

FIG. 14 is a graphical plot showing that pellets crystallized from 2 to 4 minutes exhibited an initial melting temperature by DSC from between about 161 and 174.5° C.

Figure 15:
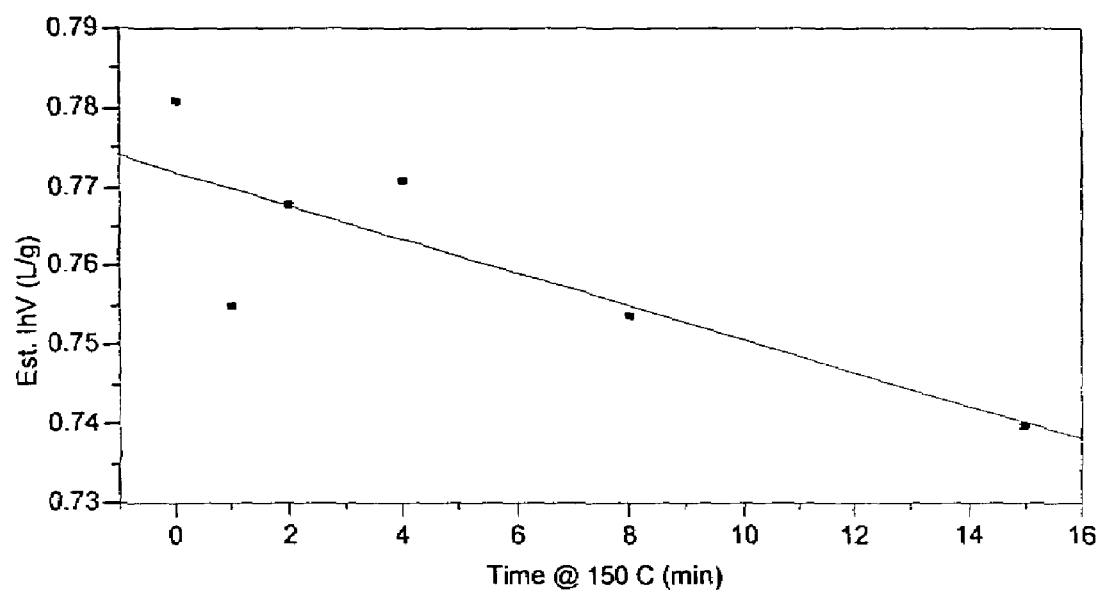

FIG. 15 is a graphical plot showing the effect of crystallization on the Ih.V of pellets at 150° C. in water over time.

Figure 16:
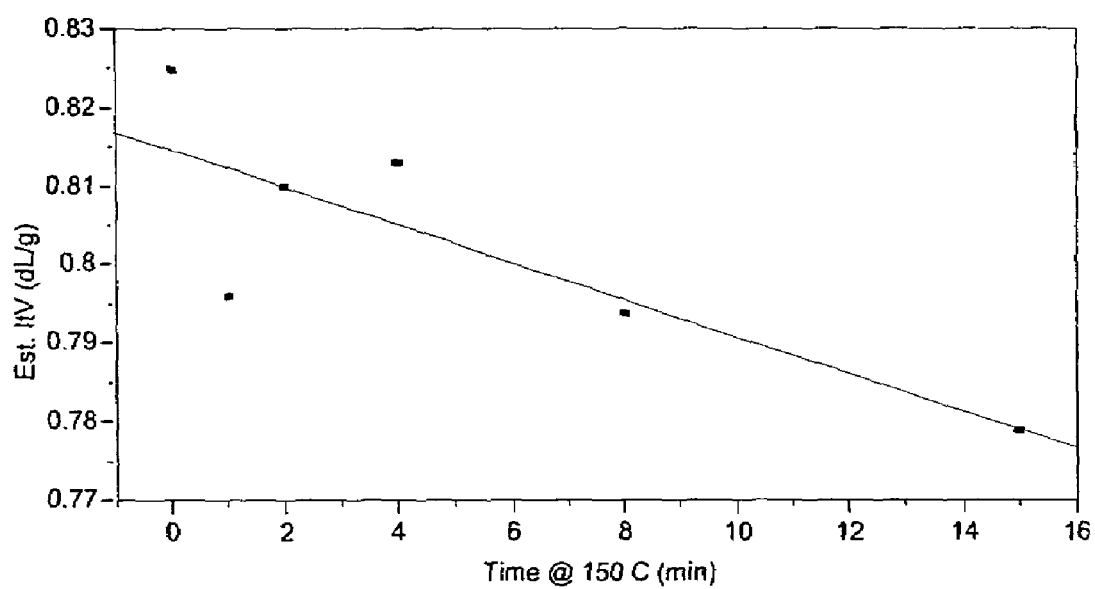

FIG. 16 is a graphical plot showing the effect of crystallization on the Ih.V. of pellets at 150° C. in water over time.

Figure 17:
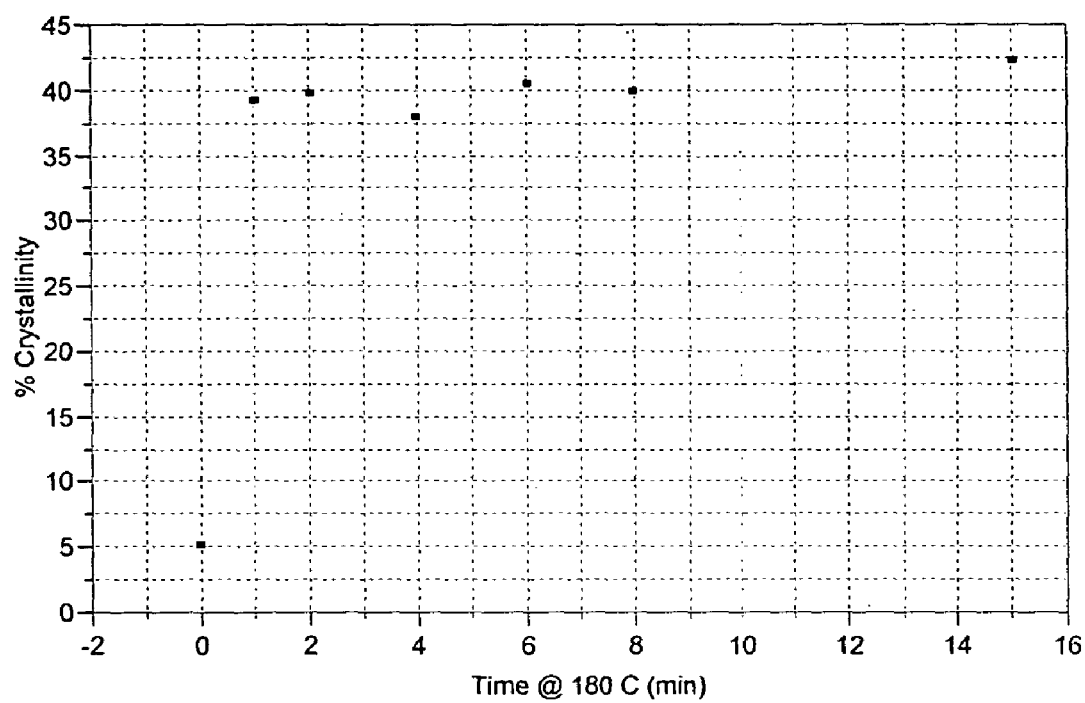

FIG. 17 is a graphical plot showing the effect on pellet crystallization over time for pellets crystallized at 180° C. in water.

Figure 18:
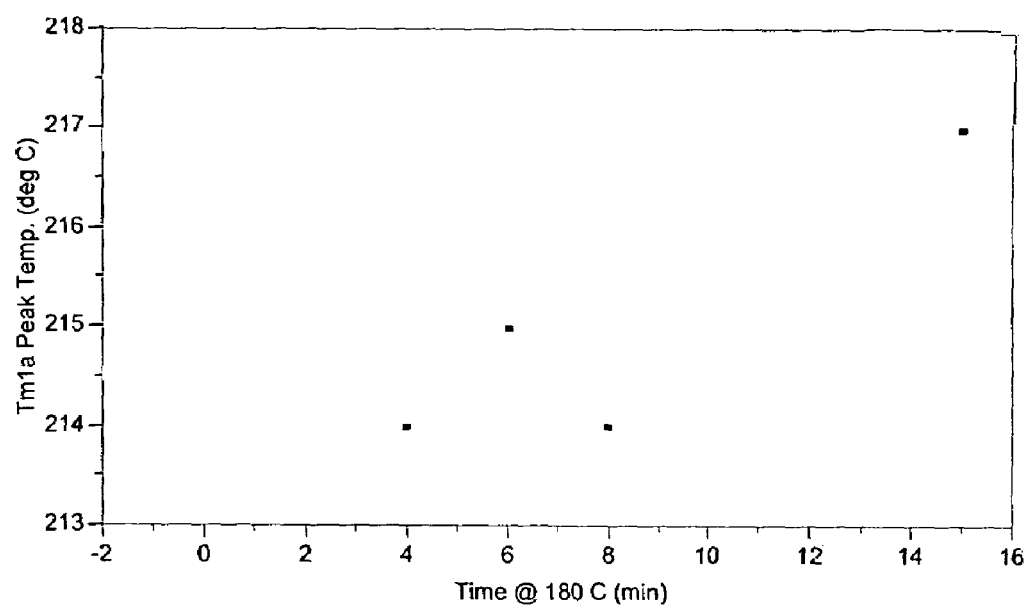

FIG. 18 is a graphical plot showing the low melt temperature of pellets crystallized in water at 180° C. over time.

Figure 19:
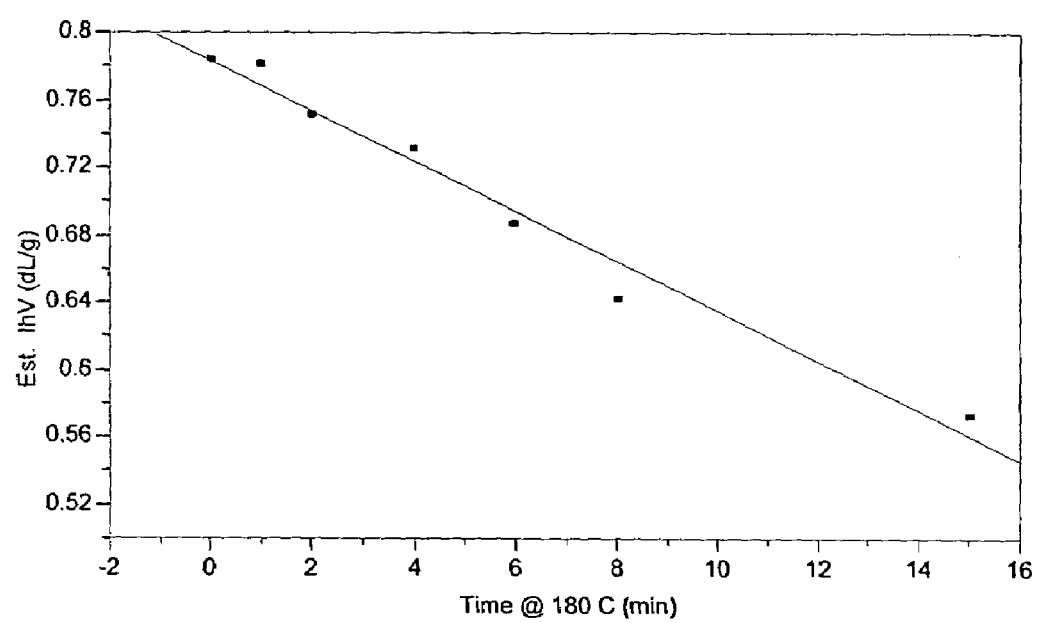

FIG. 19 is a graphical plot showing a linear fit of the estimated Ih.V. loss over a 15 min. interval for pellets crystallized in water at 180° C.

Figure 20:
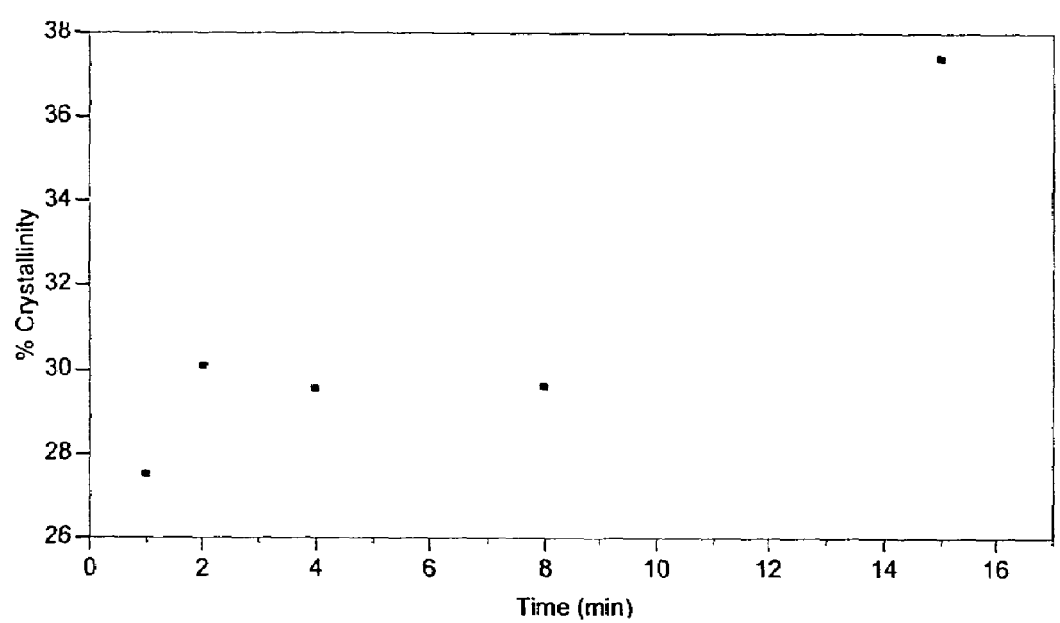

FIG. 20 is a graphical plot showing the effect on pellet crystallization over time for pellets crystallized at 150° C. in TEG.

Figure 21:
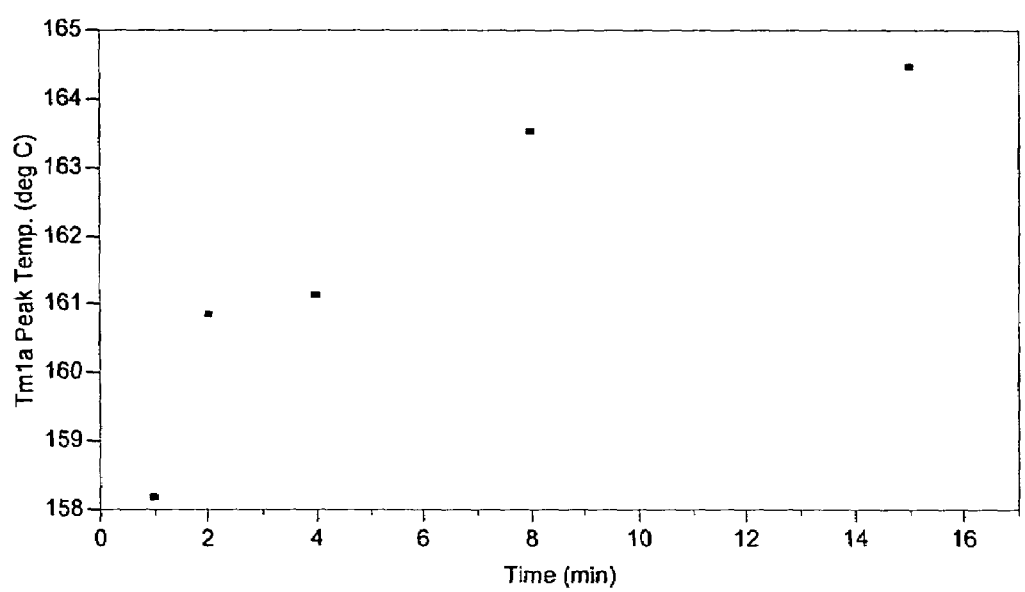

FIG. 21 is a graphical plot showing the low melt temperature of pellets crystallized in TEG at 150° C. over time.

Figure 22:
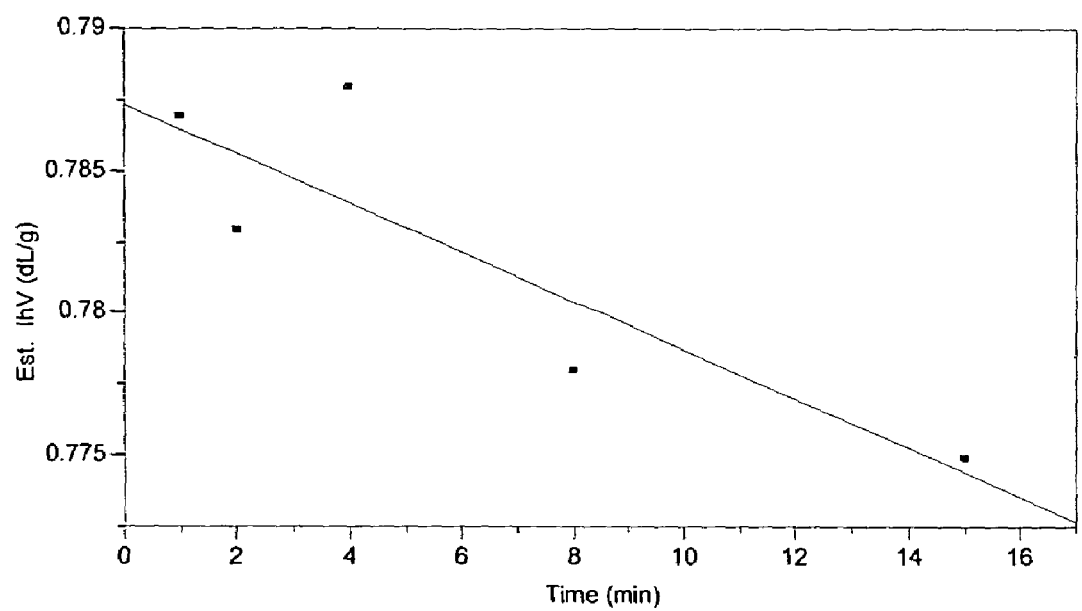

FIG. 22 is a graphical plot showing a linear fit of the estimated Ih.V. loss over a 15 min. interval for pellets crystallized in TEG at 150° C.

Figure 23:
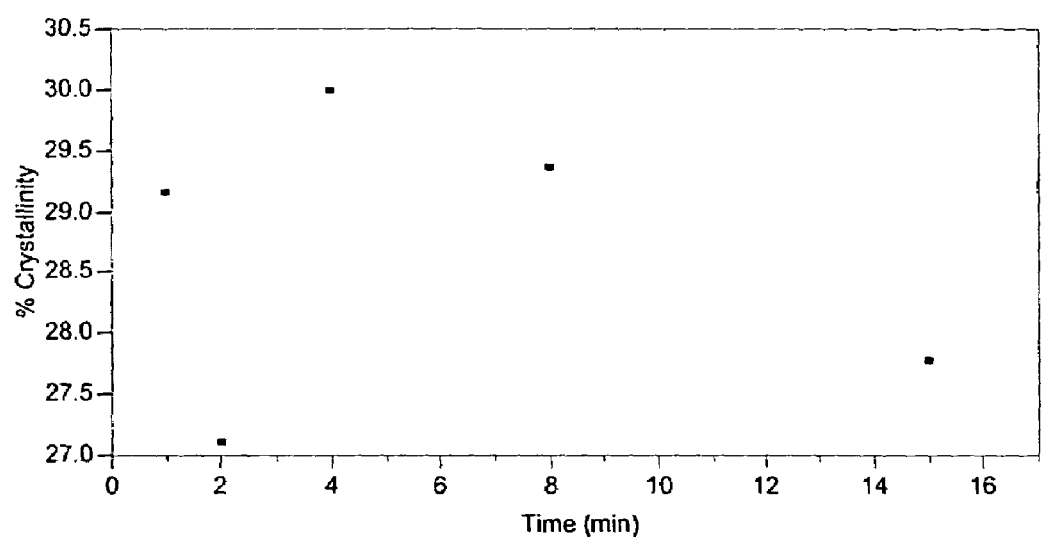

FIG. 23 is a graphical plot showing the effect on pellet crystallization over time for pellets crystallized at 160° C. in TEG.

Figure 24:
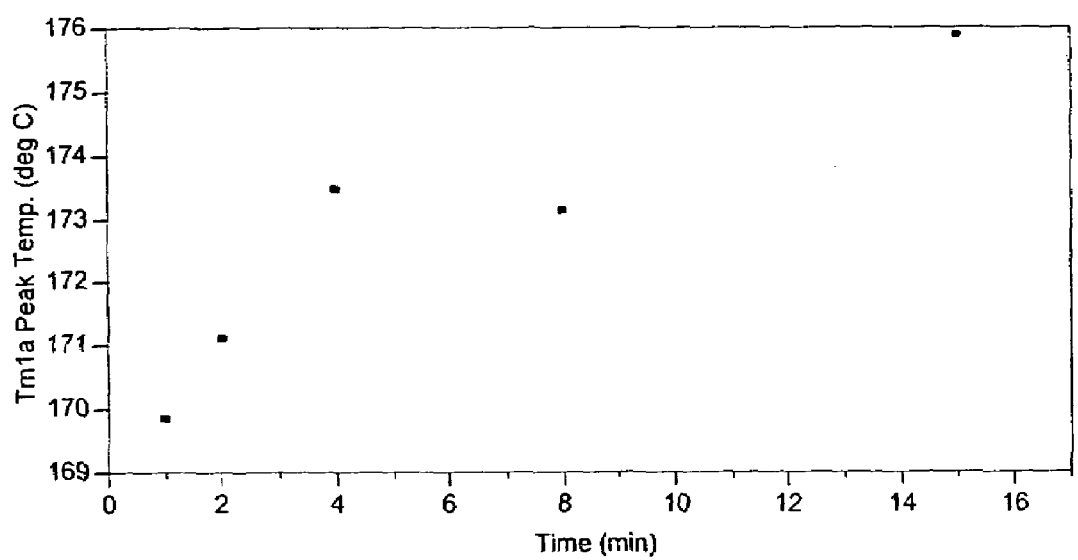

FIG. 24 is a graphical plot showing the low melt temperature of pellets crystallized in TEG at 160° C. over time.

Figure 25:
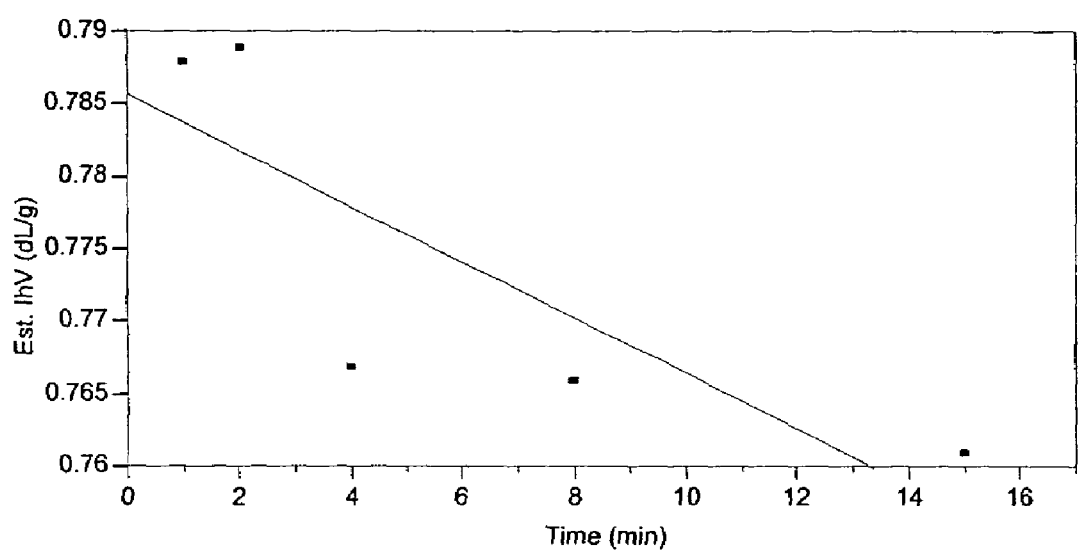

FIG. 25 is a graphical plot showing a linear fit of the estimated Ih.V. loss over a 15 min. interval for pellets crystallized in TEG at 160° C.

Figure 26:
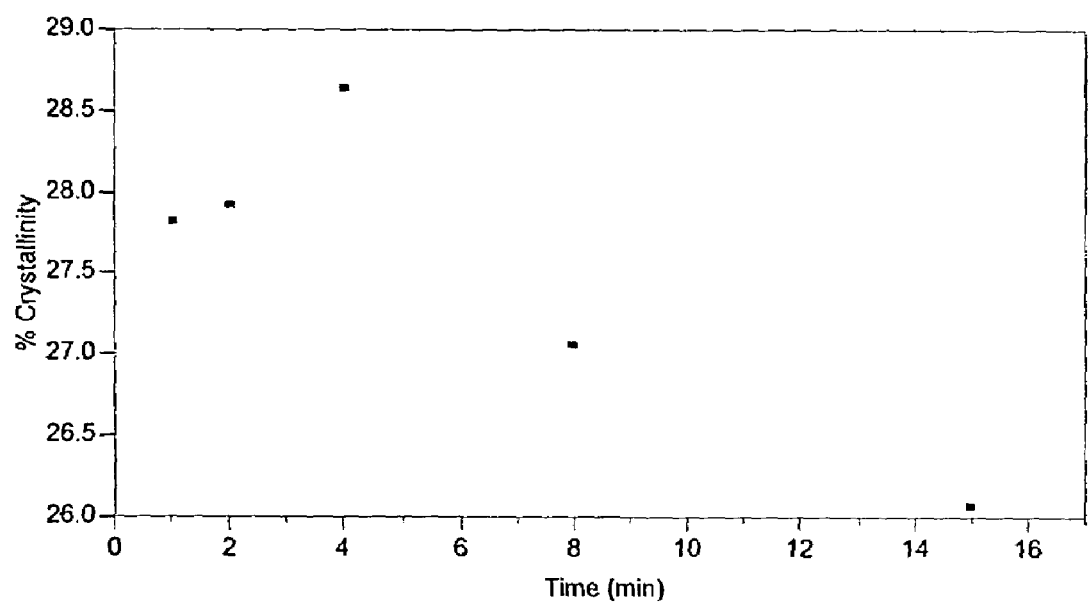

FIG. 26 is a graphical plot showing the effect on pellet crystallization over time for pellets crystallized at 170° C. in TEG.

Figure 27:
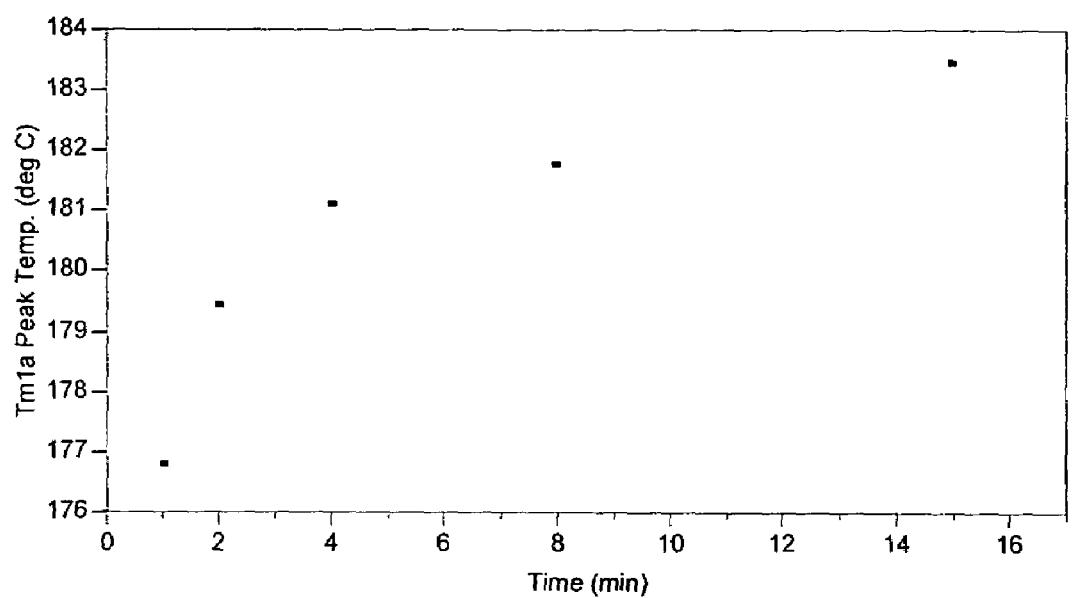

FIG. 27 is a graphical plot showing the low melt temperature of pellets crystallized in TEG at 170° C. over time.

Figure 28:
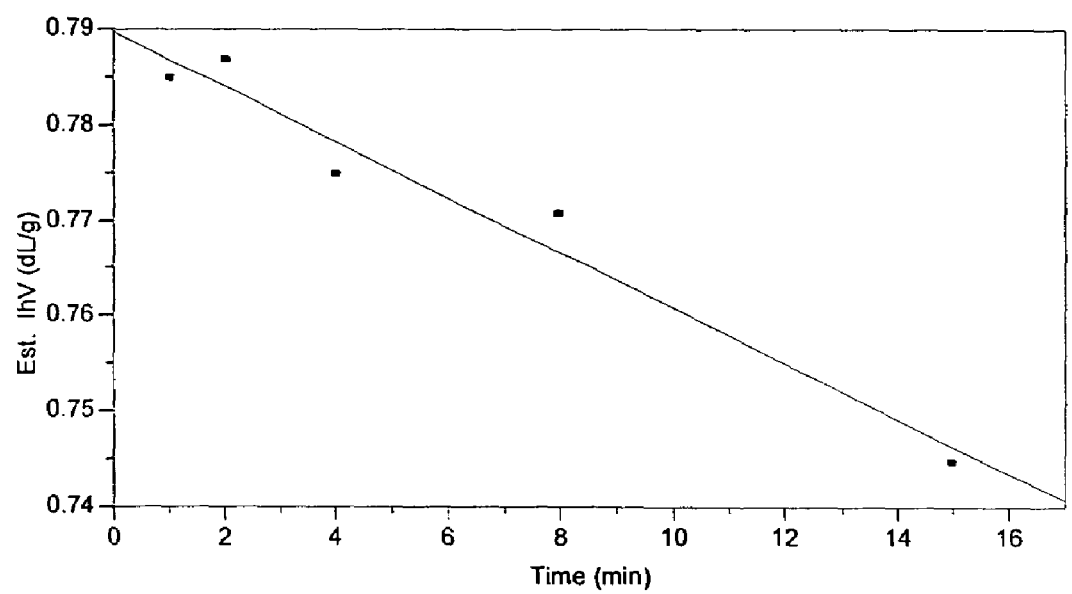

FIG. 28 is a graphical plot showing a linear fit of the estimated Ih.V. loss over a 15 min. interval for pellets crystallized in TEG at 170° C.

Figure 29:
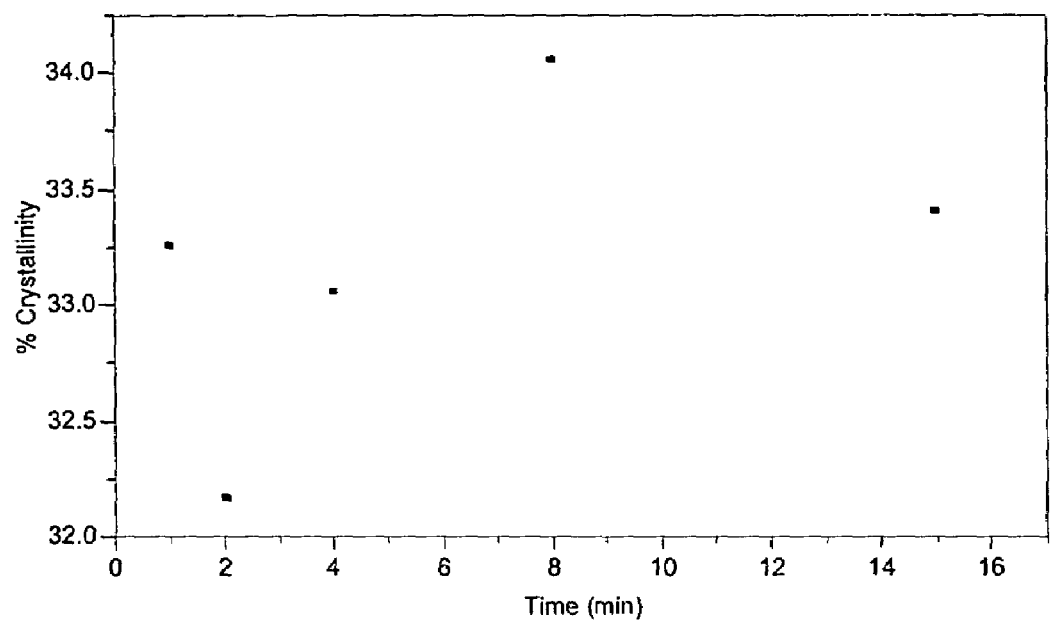

FIG. 29 is a graphical plot showing the effect on pellet crystallization over time for pellets crystallized at 180° C. in TEG.

Figure 30:
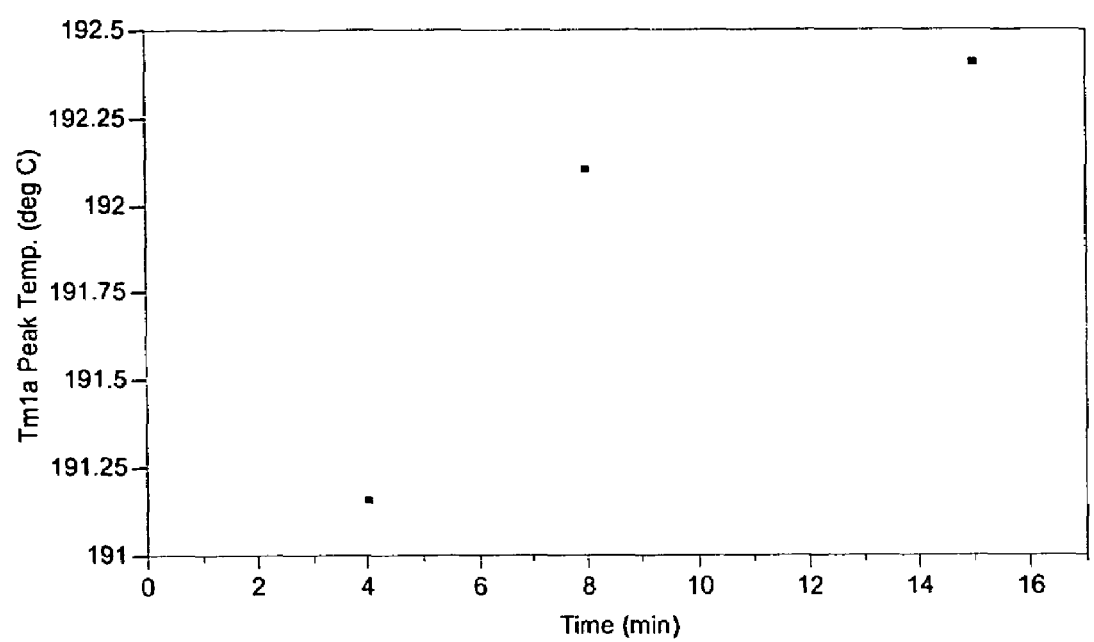

FIG. 30 is a graphical plot showing the low melt temperature of pellets crystallized in TEG at 180° C. over time.

Figure 31:
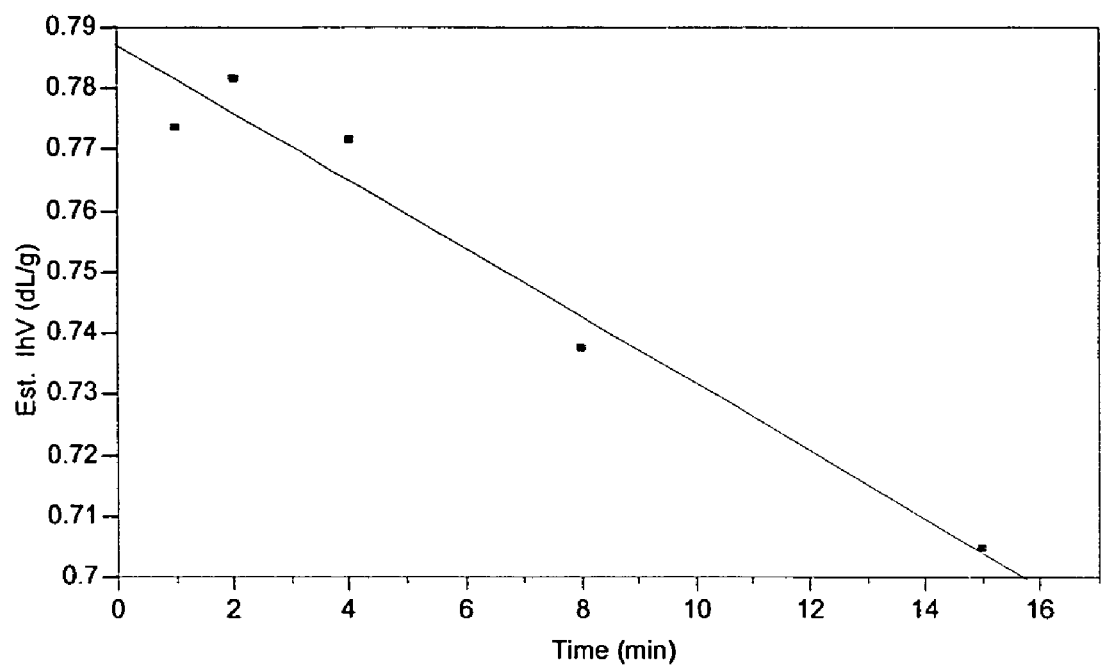

FIG. 31 is a graphical plot showing a linear fit of the estimated Ih.V. loss over a 15 min. interval for pellets crystallized in TEG at 180° C.

Figure 32:
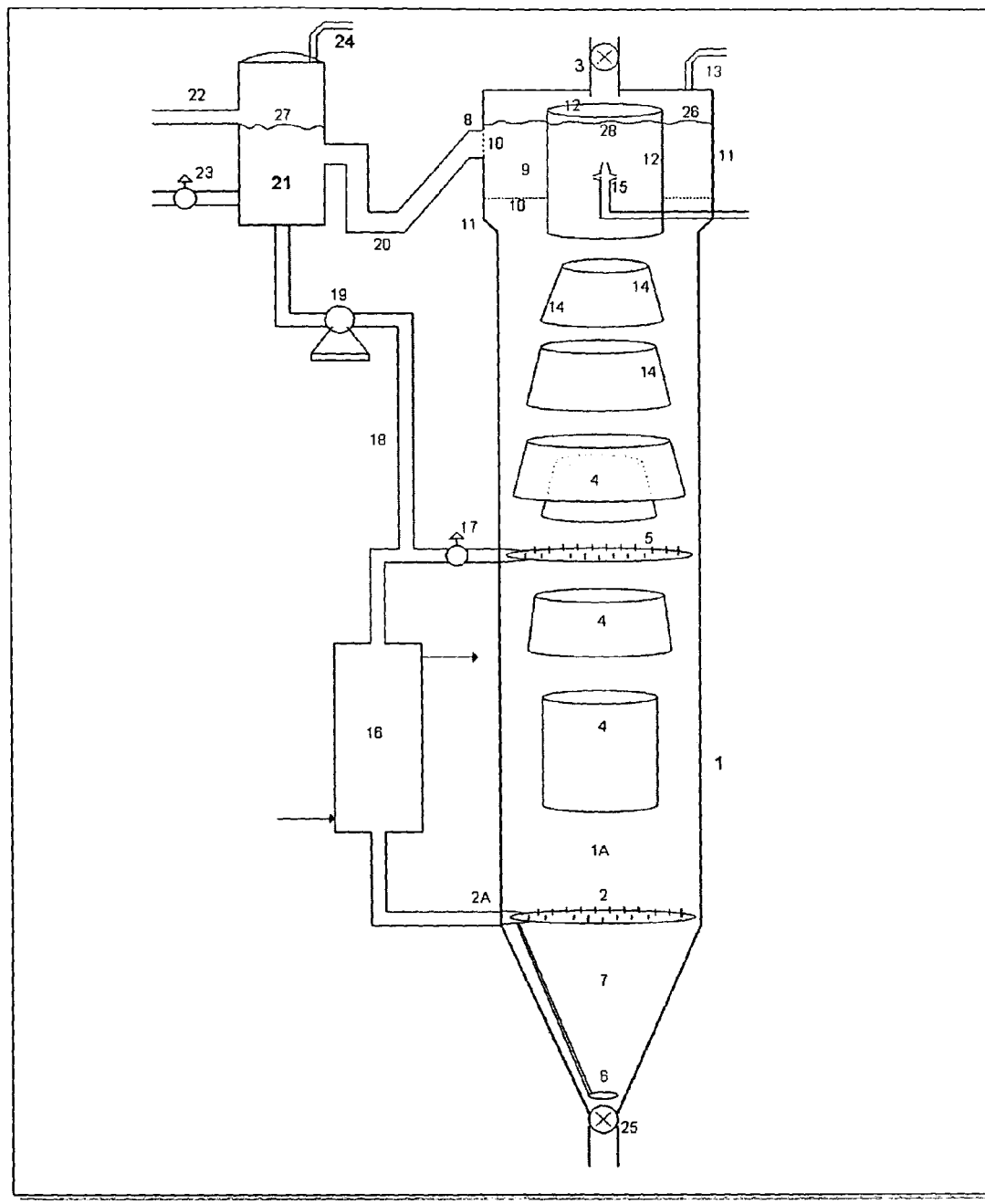

FIG. 32 is a process flow diagram of a crystallization vessel and associated equipment and vessels.

5. DETAILED DESCRIPTION OF THE INVENTION

The present invention may be understood more readily by reference to the following detailed description of the invention, including the appended figures referred to herein, and the examples provided therein. It is to be understood that this invention is not limited to the specific processes and conditions described, as specific processes and/or process conditions for processing plastic articles as such may, of course, vary.

It must also be noted that, as used in the specification and the appended claims, the singular forms "a," "an" and "the" include plural referents unless the context clearly dictates otherwise. For example, reference to processing a thermoplastic "preform", "article", "container", or "bottle" is intended to include the processing of a plurality of thermoplastic preforms, articles, containers or bottles. References to a composition containing "an" ingredient or "a" polymer is intended to include other ingredients or other polymers, respectively, in addition to the one named.

Ranges may be expressed herein as from "about" or "approximately" one particular value and/or to "about" or "approximately" another particular value. When such a range is expressed, another embodiment includes from the one particular value and/or to the other particular value.

By "comprising" or "containing" is meant that at least the named compound, element, particle, or method step etc must be present in the composition or article or method, but does not exclude the presence of other compounds, materials, particles, method steps, etc, even if the other such compounds, material, particles, method steps etc. have the same function as what is named.

It is also to be understood that the mention of one or more method steps does not preclude the presence of additional method steps or intervening method steps between those steps expressly identified.

The intrinsic viscosity values described throughout this description are set forth in dL/g units as calculated from the inherent viscosity measured at 25° C. in 60/40 wt/wt phenol/tetrachloroethane according to the calculations set forth in the Example section prior to Comparative Example 1 below.

The "polyester polymer" of this invention is any thermoplastic polyester polymer containing alkylene terephthalate units or alkylene naphthalate units in an amount of at least 60 mole % based on the total moles of units in the polymer, respectively. A thermoplastic polymer is distinguishable from liquid crystal polymers in that thermoplastic polymers have no ordered structure while in the liquid (melt) phase. The polyester polymer may optionally be isolated as such. The form of the polyester composition is not limited, and includes a melt in the manufacturing process or in the molten state after polymerization, such as may be found in an injection molding machine, and in the form of a liquid, pellets, preforms, and/or bottles.

A polyester pellet, a polyalkylene terephthalate (PAT) pellet, a polyethylene terephthalate (PET) pellet, a polyalkylene naphthalate (PAN) pellet, or a polyethylene naphthalate (PEN) pellet is a discrete polyester polymer particle which is capable of being isolated as such. The shape of the pellet is not limited, and is typified by regular or irregular shaped discrete particles without limitation on their dimensions, including flake, stars, spheres, conventional pellets, chopped fibers, and any other shape formed by the cutting blades, but may be distinguished from a sheet, film or continuous fiber.

In one embodiment, there is provided a process for thermally crystallizing a polyester polymer comprising:

a2) introducing solid amorphous pellets into a liquid medium having a temperature of at least 140° C. within a liquid medium zone within a crystallization vessel and crystallizing said solid amorphous pellets in the liquid medium at a pressure within said zone at or above the vapor pressure of the liquid medium at the liquid medium temperature without increasing the molecular weight of the pellets; and b) while the pressure on at least a portion of the pellets is equal to or greater than the vapor pressure of the liquid medium, separating at least a portion of said pellets and at least a portion of the liquid medium from each other.

Any technique used for making the polyester polymer is not limited. Typically, a polyester polymer is made by polycondensing polyesters in the melt phase. Examples of suitable polyester polymers include polyalkylene terephthalate homopolymers and copolymers modified with less than 40 mole %, preferably less than 15 mole %, most preferably less than 10 mole %, of a chain disrupting monomer (collectively referred to for brevity as "PAT") and polyalkylene naphthalate homopolymers and copolymers modified with less than 40 mole %, preferably less than 15 mole %, most preferably less than 10 mole %, of a chain disrupting monomer (collectively referred to herein as "PAN"), and blends of PAT and PAN. The preferred polyester polymer is polyalkylene terephthalate, and most preferred is polyethylene terephthalate.

Preferably, the polyester polymer contains at least 60 mole % ethylene units and at least 60 mole % terephthalate units, or at least 85 mole %, or at least 90 mole % of each respectively, and most preferably at least 92 mole %, based on the polyester polymers. Thus, a polyethylene terephthalate polymer may comprise a copolyester of ethylene terephthalate units and other units derived from an alkylene glycol or aryl glycol with an aliphatic or aryl dicarboxylic acid.

A PET polymer is a polymer obtained by reacting terephthalic acid or a $C_1$–$C_4$ dialkylterephthalate such as dimethylterephthalate, in an amount of at least 60 mole % based on the moles of all aromatic carboxylic acids and their esters, and ethylene glycol in an amount of at least 60 mole % based on the moles of all diols. It is also preferable that the diacid component is terephthalic acid and the diol component is ethylene glycol. The mole percentage for all the diacid component(s) totals 100 mole %, and the mole percentage for all the diol component(s) totals 100 mole %.

The polyester pellet compositions may include admixtures of polyalkylene terephthalates along with other thermoplastic polymers such as polycarbonate (PC) and polyamides. It is preferred that the polyester composition should comprise a majority of polyalkylene terephthalate polymers or PEN polymers, more preferably in an amount of at least 80 wt. %, most preferably at least 95 wt. %, based on the weight of all thermoplastic polymers (excluding fillers, compounds, inorganic compounds or particles, fibers, impact modifiers, or other polymers which may form a discontinuous phase).

In addition to units derived from terephthalic acid, the acid component of the present polyester may be modified with units derived from one or more additional dicarboxylic acids, such as chain disrupting dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acid units useful for modifying the acid component are units from phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "dicarboxylic acid". It is also possible for monofunctional, trifunctional, and higher order carboxylic acids to modify the polyester.

In addition to units derived from ethylene glycol, the diol component of the present polyester may be modified with units from additional diols and chain disrupting diols including cycloaliphatic diols preferably having 6 to 20 carbon atoms and aliphatic diols preferably having 3 to 20 carbon atoms. Examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propanediol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4- hydroxypropoxyphenyl)-propane. Typically, polyesters such as polyethylene terephthalate polymers are made by reacting a glycol with a dicarboxylic acid as the free acid or its dimethyl ester to produce an ester monomer, which is then polycondensed to produce the polyester.

The polyester compositions of the invention can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

To further illustrate, a mixture of one or more dicarboxylic acids, preferably aromatic dicarboxylic acids, or ester forming derivatives thereof, and one or more diols are continuously fed to an esterification reactor operated at a temperature of between about 200° C. and 300° C., typically between 240° C. and 290° C., and at a pressure of between about 1 psig up to about 70 psig. The residence time of the reactants typically ranges from between about one and five hours. Normally, the dicarboxylic acid is directly esterified with diol(s) at elevated pressure and at a temperature of about 240° C. to about 270° C. The esterification reaction is continued until a degree of esterification of at least 60% is achieved, but more typically until a degree of esterification of at least 85% is achieved to make the desired monomer. The esterification monomer reaction is typically uncatalyzed in the direct esterification process and catalyzed in ester exchange processes. Polycondensation catalysts may optionally be added in the esterification zone along with esterification/ester exchange catalysts. Typical ester exchange catalysts which may be used include titanium alkoxides, dibutyl tin dilaurate, used separately or in combination, optionally with zinc, manganese, or magnesium acetates or benzoates and/or other such catalyst materials as are well known to those skilled in the art. Phosphorus containing compounds and cobalt compounds may also be present in the esterification zone. The resulting products formed in the esterification zone include bis(2-hydroxyethyl) terephthalate (BHET) monomer, low molecular weight oligomers, DEG, and water as the condensation by-product, along with other trace impurities formed by the reaction of the catalyst and other compounds such as colorants or the phosphorus containing compounds. The relative amounts of BHET and oligomeric species will vary depending on whether the process is a direct esterification process in which case the amount of oligomeric species are significant and even present as the major species, or a ester exchange process in which case the relative quantity of BHET predominates over the oligomeric species. The water is removed as the esterification reaction proceeds to provide favorable equilibrium conditions. The esterification zone typically produces the monomer and oligomer mixture, if any, continuously in a series of one or more reactors. Alternately, the monomer and oligomer mixture could be produced in one or more batch reactors. It is understood, however, that in a process for making PEN, the reaction mixture will contain monomeric species is bis(2-hydroxyethyl)naphthalate and its corresponding oligomers. Once the ester monomer is made to the desired degree of esterification, it is transported from the esterification reactors in the esterification zone to the polycondensation zone comprised of a prepolymer zone and a finishing zone. Polycondensation reactions are initiated and continued in the melt phase in a prepolymerization zone and finished in the melt phase in a finishing zone, after which the melt is solidified into precursor solids in the form of chips, pellets, or any other shape.

Each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors, or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in many designs between the prepolymerization zone and the finishing zone is that the latter zone frequently operates at a higher temperature and/or lower pressure than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and oligomers are polymerized via polycondensation to form polyethylene terephthalate polyester (or PEN polyester) in the presence of a catalyst. If the polycondensation catalyst was not added in the esterification stage, the catalyst is added at this stage to catalyze the reaction between the monomers and low molecular weight oligomers to form prepolymer and split off the diol as a by-product. If a polycondensation catalyst was added to the esterification zone, it is typically blended with the diol and fed into the esterification reactor. Other compounds such as phosphorus containing compounds, cobalt compounds, and colorants can also be added in the prepolymerization zone or esterification zone. These compounds may, however, be added in the finishing zone instead of or in addition to the prepolymerization zone and esterification zone. In a typical DMT-based process, those skilled in the art recognize that other catalyst material and points of adding the catalyst material and other ingredients vary from a typical direct esterification process.

Typical polycondensation catalysts include the compounds of Sb, Ti, Ge, Zn and Sn in an amount ranging from 0.1 to 500 ppm based on the weight of resulting polyester polymer. A common polymerization catalyst added to the esterification or prepolymerization zone is an antimony-based polymerization catalyst. Suitable antimony based catalyst include antimony (III) and antimony (V) compounds recognized in the art and in particular, diol-soluble antimony (III) and antimony (V) compounds with antimony (III) being most commonly used. Other suitable compounds include those antimony compounds that react with, but are not necessarily soluble in the diols prior to reaction, with examples of such compounds including antimony (III) oxide. Specific examples of suitable antimony catalysts include antimony (III) oxide and antimony (III) acetate, antimony (III) glycolates, antimony (III) ethylene glycoxide and mixtures thereof, with antimony (III) oxide being preferred. The preferred amount of antimony catalyst added is that effective to provide a level of between about 75 and about 400 ppm of antimony by weight of the resulting polyester.

This prepolymer polycondensation stage generally employs a series of one or more vessels and is operated at a temperature of between about 250° C. and 305° C. for a period between about five minutes to four hours. During this stage, the It.V. of the monomers and oligomers is increased up to about no more than 0.45. The diol byproduct is removed from the prepolymer melt using an applied vacuum ranging from 5 to 70 torr to drive the reaction to completion. In this regard, the polymer melt is sometimes agitated to promote the escape of the diol from the polymer melt. As the polymer melt is fed into successive vessels, the molecular weight and thus the intrinsic viscosity of the polymer melt increases. The pressure of each vessel is generally decreased to allow for a greater degree of polymerization in each successive vessel or in each successive zone within a vessel. However, to facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, argon, helium and nitrogen.

Once an It.V. of no greater than 0.45 is obtained, the prepolymer is fed from the prepolymer zone to a finishing zone where the second half of polycondensation is continued in one or more finishing vessels generally, but not necessarily, ramped up to higher temperatures than present in the prepolymerization zone, to a value within a range of from 270° C. to 305° C. until the It.V. of the melt is increased from the It.V of the melt in the prepolymerization zone (typically 0.30 but usually not more than 0.45) to an It.V in the range of from about 0.50 to about 1.1 dL/g. The final vessel, generally known in the industry as the "high polymerizer," "finisher," or "polycondenser," is operated at a pressure lower than used in the prepolymerization zone, e.g. within a range of between about 0.2 and 4.0 torr. Although the finishing zone typically involves the same basic chemistry as the prepolymer zone, the fact that the size of the molecules, and thus the viscosity differs, means that the reaction conditions also differ. However, like the prepolymer reactor, each of the finishing vessel(s) is operated under vacuum or inert gas, and each is typically agitated to facilitate the removal of ethylene glycol.

Once the desired It.V. is obtained in the finisher, the melt is a1) generally processed in to convert the molten PET into amorphous solid pellets. The technique used for making a pellet is not limited. A suitable It.V. from the melt phase can range from 0.5 dl/g to 1.15 dl/g. However, one advantage of the process is that the solid stating step can be avoided. Solid stating is commonly used for increasing the molecular weight (and the It.V) of the pellets in the solid state, usually by at least 0.05 It.V. units, and more typically from 0.1 to 0.5 It.V. units. Therefore, in order to avoid a solid stating step, a preferred It.V. from the melt phase, which can be measured on the amorphous pellets, is at least 0.7 dL/g, or 0.75 dL/g, and up to about 1.2 dL/g, or 1.15 dL/g This feature of the invention is reflected in a second and third embodiment.

The method and equipment for converting molten polymer in the melt phase reactors to pellets is not limited, and any conventional system used for making pellets is suitable in the practice of the invention. For example, strands of the polyester polymer melt are at least surface cooled to below the $T_g$ of the polymer to form a cooled polyester polymer, followed by pelletizing the cooled polyester polymer to form solid amorphous pellets. Alternatively, the molten polymer may be extruded through a die and instantly cut into pellets before the polyester polymer cools below its $T_g$.

In the typical pelletization method, the amorphous molten polymer in the finisher section of the melt phase reactor is fed to a pelletization zone where it is optionally filtered, followed by extruding the melt through a die into the desired form and chopped or formed into pellets. The polyester polymers are optionally filtered to remove particulates over a designated size. Any conventional hot or cold pelletization or dicing method and apparatus can be used, including but not limited to dicing, strand pelletizing and strand (forced conveyance) pelletizing, pastillators, water ring pelletizers, hot face pelletizers, underwater pelletizers and centrifuged pelletizers. For reference, see Modern Plastics Encyclopedia/89, McGraw-Hill, October 1988, p. 352.

In one process, the polymers are extruded through a strand die or other suitable die, whether single filament, or as is more traditionally done, multiple filaments. With multiple filaments, it is beneficial to guide them in a parallel, non-touching fashion, through the rolls and water bath using standard strand separating devices. The polymer melt can be fed directly from the melt reactor through a die using a gear pump. It is also possible to extrude the polyester using a standard single or twin screw extruder. After extrusion into strands or any other desired shape, the polymers are at least surface cooled to below the $T_g$ of the polymer before pelletization. This may be accomplished by spraying the polymer strands or other shape with water, or immersing the extrudate in a water trough, or passing a stream of cooled air over the surface of the extrudate, or cooled in or at the die plate submersed at least partly under or in contact with a cooling liquid, in each case to promote cooling at least on the surface of the polymer strand or other shape, if not throughout the thickness of the polymer extrudate.

The polyester polymer extrudate is cooled to at least below the $T_g$ of the polymer on its surface, which is sufficient to allow the strand or other shape to be pelletized while minimizing clogging or gumming. The temperature of the surface of the strand prior to pelletizing can be determined to be below or above the $T_g$ of the polymer by the performance of the pelletizer/cutter. If the strand or other shape is too hot and the surface temperature significantly exceeds the $T_g$ of the polymer, the pelletizer/cutter gears and blades will become clogged with a sticky mass of polymer instead of producing a chopped pellet. It is not necessary to cool the strand or shape below the $T_g$ of the polymer throughout the thickness of the extrudate since surface cooling gives the strand sufficient rigidity to prevent the choppers/cutters from clogging. The rate of cooling is not limited, but it is desirable to rapidly cool the melt to increase line speed. A water spray cabinet is a preferred method for many high molecular weight polyesters, as they are commonly used in existing polymer lines. However, this may not be preferred for all polyester lines. Since the $T_g$ of PET polyesters is about 80° C.+/−5° C., in this process the molten PET polymer is preferably cooled to a surface temperature below 80° C. prior to pelletizing, and more preferably below 75° C. prior to pelletizing. Once cooled to at least below its surface $T_g$, the polyester polymer is pelletized to form solid amorphous pellets.

In another alternative process, the molten polymer may be extruded through a die and instantly cut into pellets before the polyester polymer cools below its $T_g$. Clogging the pelletizer knives and gears may be avoided by pelletizing underwater. An underwater pelletizer combines the cooling system with the cutting means into one system. In a typical process for underwater cutting, molten polymer or melt flow is pumped from a gear pump or an extruder through a die plate having multiple orifices of diameters generally from about 0.05 to 0.15 inch, to the cutter. Usually, a hot, high temperature heat transfer liquid is circulated through the die channels so as to heat the die plate and promote flow of the polymer through the die plate. Electrical or other means of heating are also possible. A rotatable knife flush with the die plate severs the individual streams into pellets as the streams exit the orifices. A water housing is provided within which water is circulated against the face of the die plate where the molten polyester polymer is cut. Circulating water, typically at a temperature of 25° C. to 100° C., enters the water housing and into contact against the face of the die plate to cool the pellets. The circulating water contacts the molten polyester polymer as it exits the die at the point where it is formed into a pellet in order to prevent creating a sticky mass which can clog the pelletizer cutters and gears. As the pellets are formed by the revolving knife when the molten polymer is extruded through the orifices and sheared by the knife, the pellets or still molten polymer globules and water exit as a slurry.

Preferably, the entire cutting mechanism and the molten polyester polymer are underwater at the point where the polymer is pelletized. By pelletizing underwater, the molten polymer is in continuous contact with water upon exiting the die, at the point of being pelletized, and is then carried away from the cutting mechanism by a circulating stream of water. Prior to crystallization or dewatering, the surface of the polymer is further cooled to at least below the $T_g$ of the polymer if the polymer was discharged from the pelletizer as a molten globule. The slurry then flows to the crystallizer or flows to a dewatering section where water is separated from the pellets and the pellets are optionally dried in a separate vessel or in the separation device. For example, the slurry may be fed to a centrifugal dryer for separation and drying. The pellets then may pass to a storage silo after the water is removed, or they may be directly conveyed to the crystallizer.

The pellet size and dimension are not limited. Suitably, the pressure, flow rates, the number and size of holes in the die plate, and speed of cutting blades are synchronized to produce a pellet having an aspect ratio of about 0.6 to about 2.0 and a length in its longest dimension of about 0.05 to 0.2 inches.

If desired, an optional intervening step in a strand pelletization method includes partially strain crystallizing the strand to a degree below that desired for final use in a dryer feeding an injection molding machine, such that the underfluid crystallization process described herein is required to make an acceptable crystallized pellet. The strands may be optionally uniaxially stretched at a temperature only slightly higher than Tg prior to the cooling step to promote strain induced crystallization. The chain alignment resulting from stretching imparts some degree of crystallinity and makes crystallization occur at a considerably higher rate.

In step a2) of the invention, solid amorphous pellets are introduced into the liquid medium in a liquid medium zone where thermal crystallization is induced. Regardless of how or when the pellets are introduced into the liquid medium, the pellets are solid, meaning that at the time the pellets are introduced into the $\geq 140°$ C. liquid medium, the surface temperature of the polymer and preferably the whole polymer temperature is below the $T_g$ of the polymer. At a liquid medium temperature of 140° C. or more, the polymer temperature will, of course, approach the liquid medium temperature and given sufficient residence time, match the liquid medium temperature. The temperature of the polyester polymer during crystallization is not determinative of whether the polymer is or is not a solid. Thus, the polyester polymer is referred to as a solid even when subjected to 140° C. to 180° C. liquid medium temperatures during crystallization, provided that the temperature on at least the surface of the polyester polymer upon introduction into the liquid medium at any designated liquid medium temperature was below the $T_g$ of the polymer. In the process of the invention, the polyester polymer is introduced into the liquid medium as a solid and crystallized starting from the solid state or from the glass rather than introduced into the liquid medium as a solution or in the molten state.

The $T_g$ of the polyester polymer may be determined by subjecting the polymer to a DSC scan according to the following test conditions: about 10 mg of sample is heated from 25° C. to 290° C. at a rate of 20° C./min. in a Mettler DSC821. The sample is held at 290° C. for 1 minute, removed from the DSC furnace and quenched on a room-temperature metal sample tray. Once the instrument has cooled to 25° C. (about 6 min.), the sample is returned to the furnace and taken through a second heat from 25° C. to 290° C. at a rate of 20° C./min. The $T_g$ is determined from the second heat.

The form in which the solid pellets are fed to the crystallization vessel is not limited. The crystallization vessel may be fed with a slurry of solid pellets in a fluid such as water, or fed with dewatered but slightly moist pellets, or fed with dewatered and dried pellets. Also, the timing for introduction of the pellets into the crystallization vessel is also not limited. The dewatered and dried pellets may optionally be stored in inventory under an inert atmosphere prior to introduction into the $\geq 140°$ C. liquid medium. Alternatively, the polyester polymer pellet may be derived from scrap polyester polymer or recycle polyester polymer optionally blended with virgin polymer before the polymer is finally subjected to the crystallization method described herein.

The pellets are not only solid but also amorphous. By amorphous we mean that the pellets have less than the final desired degree of crystallinity prior to solid stating or introduction into the dryer hoppers feeding the extruder for making performs or for any other desired application. Typically, the amorphous pellets fed to a liquid medium zone will have a degree of crystallinity of 15% or less, or 10% or less, and more commonly 5% or less, as measured by the DSC method described in the Examples. For pellets, a gradient tube density method can also be used to calculate % crystallinity. The density method is also referenced in the Examples. In the 150° C. case of Example 3, there is a comparison of limited data from pellets tested by both methods. The DSC method is sensitive to the quality of the baseline applied to the peaks prior to integration of the area under the peaks. The density method is sensitive to the quality of the pellets tested.

The crystallization vessel(s) is desirably equipped with an inlet for receiving the liquid medium in which the pellets are crystallized. The feed of liquid medium may originate from a fresh source, recycled from a liquid/solid dewatering step as described below or from any other source in the process for making PET, or a mixture of both. The liquid medium is heated in a preheater, heat exchanger, by a boiler, or any other pressure rated heating means to a temperature of at least 140° C. and fed to the inlet of the crystallization vessel through a pipe while keeping the liquid medium in the liquid state. Alternatively, the liquid medium can be warmed to a temperature below its normal boiling point, fed to the crystallization vessel, and heated within the liquid medium zone to a temperature of at least 140° C. The flow rate of the liquid medium should be sufficient to submerge the amorphous pellets and to maintain the liquid medium zone at the desired temperature, and the particular flow rate will depend on the liquid medium zone volume and the pellet feed rate. A single solitary pellet is considered submerged in the liquid medium when the liquid medium envelops the entire pellet. On a bulk macro scale, the pellets are considered submerged if the bulk of the pellets are enveloped in the fluid prior to discharging the pellets from the crystallization vessel even though some of the pellets at any one point in time are temporarily on or above the surface of the liquid medium, which may occur in a turbulent environment.

Water is a suitable liquid medium. Other media which do not substantially depolymerize the polymer under the selected crystallization conditions are also suitable. With many media, including water, it is understood that the It.V. of the pellets may decrease with an increase residence time, and the rate of It.V. loss increases at the temperature increases. Thus, the process conditions can be adjusted to balance the rate of crystallization against the loss of It.V. However, using water as a benchmark, it is desirable to select a liquid medium in which the rate at which the pellet It.V. loss under a given set of process conditions is less than twice the loss of the same type of pellets under the same process conditions in water. It is contemplated that under a first set of particular process conditions, a liquid medium may be suitable but under a second set of process conditions, the same liquid medium may have more than twice the loss of It.V. compared with water under the other process conditions. Nevertheless, such a liquid medium is considered desirable under any process conditions other than those in which the It.V. loss is more than twice the It.V. loss of water under those same conditions.

In addition to adjusting the process conditions, the liquid medium composition can be changed by switching altogether to a different liquid composition, or by mixing other liquids into the primary liquid used.

It is also desired to use liquids which have a high heat capacity to optimize heat transfer to the pellets at the lowest possible residence time. Liquids which have low vapor pressures are also desirable to further reduce equipment costs since a vessel with a lower pressure rating can be used. However, a significant and sometimes overriding factor to consider in the selection of the liquid is the ease with which the liquid is separated from the pellets, the ease with which the liquid is volatized from the inside of the pellet, and the costs associated with handling, heating and recirculating the separated liquid back to the crystallization vessel.

Examples of liquids which are suitable for use in the process include water; polyalkylene glycols such as diethylene glycol and triethylene glycol; and alcohols. In addition to the continuous process adjustments that can be made to vessel pressure and the temperature discussed further below, the residence time, degree of crystallization, and energy efficiency can also be controlled by the optimal selection of the heating medium. The heat capacity of water, 1 cal/g/° C., is attractive and the ease with which water is separated from the pellets and volatized from the pellets is excellent. The vapor pressure of water is about 24 torr at room temperature, 760 torr at 100° C., 2706 torr at 140° C., and 7505 torr at 180° C.

Polyalkylene glycols, such as diethylene glycol and triethylene glycol, have a lower vapor pressure than water. The temperature of a liquid medium of polyalkylene glycols can be set higher than water at the same pressure to reduce the residence time of the pellets in the liquid medium, or to reduce the pressure inside the liquid medium zone at the same temperature used for heating water. Due to their lower vapor pressure, devolatizing glycols from the pellets is more energy intensive than water. However, both water and glycols are suitable and the preferred liquids for use as the liquid medium.

If desired, a mixture of water with other liquids which depress the vapor pressure of the liquid medium can be used. For example, water can be mixed with other glycols in an amount not exceeding the solubility of the glycols in water under the operating conditions in the liquid medium zone. It is preferred to use liquids which are water soluble so that excess liquid can be removed from the pellets by water washing.

The liquid medium zone in the crystallization vessel is the cavity in which the pellets are submerged in the liquid medium under conditions effective to induce crystallization, and does not include the inlets, discharge tubes, pumps, probes, metering devices, heat exchangers, and other associated equipment. It is in the liquid medium zone that the temperature of the liquid medium reaches at least 140° C. Considering that there may exist a temperature gradient throughout the height or breadth of the zone, the temperature of the liquid medium in the liquid medium zone is considered to be at 140° C. if at any point or stage in the liquid medium the temperature reaches at least 140° C. It is preferred, however, that the temperature of the liquid medium remains at 140° C. throughout at least 50%, more preferably throughout 75% of the liquid medium zone at its longest axis, and most preferably at both the inlet and discharge outlet for the liquid medium in and from the liquid medium zone. The temperature may be measured by any conventional technique including thermal probes in contact with the liquid in the liquid medium zone. The temperature of the liquid medium may exceed 140° C. to more rapidly crystallize and may reach up to about 200° C., beyond which either there is no further significant increase in the actual rate of crystallization, or the rate of hydrolysis becomes unacceptable, or both. In the practice of the invention, the most commonly employed temperatures will range from 140° C. to 180° C.

The pressure within the liquid medium zone is kept at or above the vapor pressure of the liquid medium at the reaction temperature employed to prevent the liquid medium from boiling and keep the pellets submerged in a liquid medium for optimal heat transfer and reduced residence time. The vapor pressure of a liquid is normally determined experimentally from the pressure exerted by its vapor when the liquid and vapor are in dynamic equilibrium. However, it is possible in actual practice that that the liquid and vapor in the liquid medium zone may not be in equilibrium at any single point in time or location within the fluid because of variations in pressure from perturbations in the system well known to those skilled in the art, such as pressure differentials across piping, valves, weirs, etc. and non-uniform heating. As a result, it is possible that less static pressure on the liquid is needed to keep the liquid medium from boiling compared to the static pressure needed to keep that same liquid from boiling in a closed system in dynamic equilibrium. Accordingly, the pressure within the liquid medium zone is also deemed to be at or above the vapor pressure of the liquid medium if the liquid medium does not boil, even though the actual static pressure in the liquid medium zone may be slightly less than the theoretical pressure needed to exceed the dynamic vapor pressure of the liquid medium.

So long as the pressure within the liquid medium zone is kept above the vapor pressure of the liquid medium, pressure is a convenient variable to control the boiling point of the liquid medium and thereby increase the temperature at which the medium can stay in the liquid phase, allowing the use of higher temperature resulting in an increase in the rate of crystallization. Using water as an example, its boiling point at 52 psia is 140° C., and at 69 psia is 150° C., 115 psia at 170° C., 145 psia at 180° C. Accordingly, the pressure can be set high to increase the boiling point of water, permitting the use of higher temperature and the resulting reduction of residence time required for the pellets in the liquid medium. Other than the requirement that the pressure within the liquid medium zone be at or exceed the vapor pressure of the liquid medium under any given temperature, suitable pressures for most liquids range anywhere from sub-atmospheric, e.g. 1 psia, for such low vapor pressure liquids as glycols and up to and beyond the pressure needed to keep the liquid medium from boiling at a temperature near the temperature corresponding to the maximum crystallization rate of the pellet. For example, pressures of at least 25, or at least 100, or up to 150, and even up to about 200 psia are contemplated as suitable for most applications.

In addition to adjusting the composition of the liquid medium and the temperature and pressure variables, the residence time and the degree of crystallization can also be balanced against the energy requirements of the system. The pellets are crystallized in the liquid medium zone for a time sufficient to induce crystallinity. The residence time is defined as the time lapse between the introduction of a pellet into a liquid medium at a temperature sufficient to induce crystallization and the time when the pellet is removed from the conditions which promote crystallization. Recognizing that crystallization can be induced in a pellet at stages in the process outside of the crystallization vessel, the "residence time lmz" refers to the time lapse between the introduction of the pellet into the liquid medium at a temperature of at least 140° C. within the liquid medium zone to the separation of the pellet and water from each other. The minimum residence time lmz necessary is that which induces crystallinity in the pellet. Crystallinity has been induced in a pellet when the final degree of crystallization in the pellet is greater than the amorphous pellets' initial degree of crystallization when fed to the crystallization vessel. The maximum residence time lmz is desirably short to limit the cycle time, reduce the equipment cost, and to minimize It.V. loss. In the process of the invention, the It.V. (which can be correlated to the weight average molecular weight) of the pellets is not substantially increased. Increasing the It.V. of the pellets in the liquid medium zone is to be avoided and does not result in the process of the invention. In the process of the invention, the pellets experience no statistically significant It.V. gain and have the same or a lower It.V. after crystallization compared to the initial It.V. prior to entry into the liquid medium zone.

Residence times lmz of 10 minutes of less are feasible to obtain a final degree of crystallinity of 20% or more, or 25% or more, 30% or more, and even up to 40% or more in the pellet, from a pellet taken immediately after its separation from the liquid medium. For most applications, a degree of crystallinity ranging from 25% to 45% is suitable. The residence time can even be as low as greater than 0 minutes to 8 minutes depending upon the crystallization temperature and the rate at which the polymer crystallizes. At temperatures ranging from 140° C. to 180° C., the crystallization time to obtain a degree of crystallinity of 25% or more and even 30% or more ranges from greater than 0 minutes to about 4 minutes or less. A residence time of up to 1 hour may also be suitable in the practice of the invention with suitable liquid media and reaction conditions. In a preferred embodiment, the pellet degree of crystallization prior to subjecting it to a temperature of 140° C. in a liquid medium is 10% or less, more preferably about 5% or less.

The average degree of crystallinity is that which is desired for the particular application and is otherwise not particularly limited. However, the process of the invention is capable of rapid crystallization to a degree of crystallinity of at least 25% or obtaining an increase in crystallinity of at least 20 percentage points relative to the degree of crystallinity of the starting amorphous pellet prior to thermal crystallization. Keeping in mind that inducing crystallinity is primarily to prevent the pellets from sticking in a solid stating or drying step and that crystallinity is in any event destroyed once the pellets are injection molded, only a sufficient amount of crystallinity to prevent sticking is required. In a preferred embodiment, the pellets are not solid stated because the It.V. of the pellets are already sufficiently high to be injection molded into performs and then to be blow molded into clear bottles with suitable physical properties. Thus, the degree of crystallinity only needs to be as high as necessary to prevent the pellets from sticking together in a dryer and to reduce the amount of time needed to devolatize liquids in the pellet prior to injection molding by increasing the drying temperature.

In a more preferred embodiment of the invention, crystallization is conducted in the absence of rotating mechanically induced agitation in the liquid medium zone. Horizontal liquid filled, rotating paddle agitated vessels are known to provide the necessary motion to prevent the pellets from agglomerating during crystallization. In this embodiment, however, capital and operating costs are reduced by avoiding rotating mechanically induced agitation during crystallization while also avoiding agglomeration. This may be accomplished by feeding the pellets into a non-horizontally oriented liquid medium zone filled or nearly filled with a liquid and allowing the pellets to settle through the fluid toward the bottom of the vessel while providing the pellets with the buoyancy and necessary residence time with an upflow of fluid countercurrent to the flow of the pellets and/or by controlling the density difference between the pellets and the liquid medium. This embodiment is explained in further detail below.

Fluids are excellent lubricating media, and by agitating the pellets through the turbulence of an countercurrent upflow of fluid in some regions of the liquid medium zone and optionally a laminar flow in other regions of the liquid medium zone near the fluid discharge nozzle, the tendency of the pellets to agglomerate is reduced or altogether avoided. While sporadic or minor agglomeration may occur in the liquid medium zone, the frequency or number of pellets agglomerating does not interfere with the operation of the dewatering equipment (e.g. rotary valve) such that the pellets ejected from such equipment are discrete pellets ready for introduction into a dryer hopper attached to a melt extruder for making performs. Alternatively, sticking may be avoided in the absence of rotating mechanically induced agitation by continuously flowing pellets through a pipe oriented horizontally or non-horizontally. Preferably, the pipe is devoid of mechanically rotating paddles, and more preferably is devoid of in-line mixers, weirs, or baffles. In a pipe, the flow of the liquid is desirably in the same direction as the flow of the pellets.

In step b) in some of the embodiments of the invention, once the pellets have been crystallized to a degree in the liquid medium zone, or simultaneous to the pellets undergoing crystallization, at least a portion of the crystallized pellets are separated from the liquid medium while the pellets are under a pressure equal to or greater than the vapor pressure of the liquid medium. The separation of the pellets from the liquid medium will generally be a separation in which the pellets are removed from the bulk of the liquid medium while leaving some liquid on the surface of the pellets or in the interstices between the pellets. The remainder of the liquid on the pellets can be removed in a drying step. Thus, in the process of the invention, not all of the liquid medium has to be separated from the crystallized pellets. Moreover, while the invention is described in various steps, it is to be understood that steps a2) and b) may occur in discrete stages or zones, simultaneously, in batch mode, continuously, or any combination of the foregoing. It is preferred to continuously separate the pellets from the liquid medium present in the liquid medium zone, and it is also more preferred that while the pellets are continuously being separated from the liquid medium, that the liquid medium is simultaneously being removed from the liquid medium zone while the pressure on the pellets is equal to or greater than the vapor pressure of the liquid medium. This more preferred embodiment is described in more detail by way of an illustration in FIG. 32 and its description.

The separation of liquid from pellets may be conducted while the pellets are under a pressure greater than atmospheric pressure, or in the event that the liquid medium has a vapor pressure less than or equal to 1 atmosphere, then separating the pellets from the liquid medium at or above the vapor pressure of the liquid medium. At a minimum, however, the liquid medium will be separated from the pellets while the liquid medium is under a pressure equal to or greater than the vapor pressure of the liquid medium. It is also to be understood that the means for separation is not limited, and can be accomplished whether the pellets are separated from the liquid medium, the liquid medium is separated from the pellets, or both. Thus, any one or a combination of each activity is contemplated whenever a separation is referred to in the description of the invention.

When the pellets are separated from the liquid medium (for convenience referred to as a "dewatering" step which includes the use of any liquid medium) while the pellets are under a pressure equal to or greater than the vapor pressure of the liquid medium, or at atmospheric or greater, the head pressure on the slurry of pellets and liquid medium immediately prior to the separation is equal to or greater than the vapor pressure of the liquid medium, or in the case of an atmospheric embodiment, equal to or greater than ambient pressure, about 1 atmosphere, and is independent of the pressure on the pellets or on the liquid medium immediately after the pellets have undergone a separation operation or have been removed from the liquid medium zone. The pressure on the pellets is deemed to be the same pressure as the pressure on the liquid medium surrounding the pellet about to be separated. Thus, conducting the separation of the pellets under a pressure equal to or greater than the vapor pressure of the liquid can be distinguished from allowing the whole of the liquid medium pressure to drop below its vapor pressure prior to separating the pellets because in this case, every pellet separated is under a pressure less than the vapor pressure of the liquid medium. A pressure drop across the mechanical means for conducting the separation is contemplated, provided that the bulk of the pellets remain under a vapor pressure equal to or greater than the vapor pressure of the liquid medium before entering the mechanical separation device.

Thus, in the process of separating the liquid medium from the pellets in step b) of the invention, the pellets may be dewatered with no pressure drop on the liquid medium, or the pellets may be dewatered with no pressure drop on the liquid medium and the pellets, or the liquid medium and/or the pellets may be subjected to a sudden and immediate pressure drop during or after the dewatering step down to atmospheric pressure, or the liquid medium and/or pellets may be subjected to a sudden pressure drop during or after the dewatering step down to a pressure equal to or greater than atmospheric, or the liquid medium and/or pellets may be subjected to a gradual step wise or continuous pressure drop during and after dewatering, and in each of these cases, the slurry may be subjected to the dewatering step starting from a pressure about the same as the liquid medium zone pressure or from a pressure equal to or greater than atmospheric or from a pressure between atmospheric up to the dewatering pressure or even greater. In each case, however, the pressure on the pellet slurry is equal to or greater than the vapor pressure of the liquid medium immediately prior to dewatering.

This dewatering step can take place in the liquid medium zone, or the slurry of pellets and liquid can be discharged from the liquid medium zone and transported to a device for separating the pellets from the liquid under pressure if needed, such as when water is used as the liquid medium. If the liquid medium is depressurized, the temperature, head pressure, and pressure drop across the dewatering equipment should preferably be set to minimize losing the liquid medium due to flashing and thereby avoid energy loss and/or adding costly condensers. It is also preferred to dewater starting from a pressure close to the liquid medium zone pressure to reduce the residence time of the slurry after completion of crystallization and before dewatering. While in step b) the pressure on the slurry prior to dewatering is equal to or greater than vapor pressure of the liquid medium, if desired the pressure on the slurry prior to dewatering is at least 70%, more preferably at least 80%, and most preferably at least 90% of the pressure in the liquid medium zone in order to reduce the cycle time, avoid the use of cooling equipment, and/or avoid loss of a part of the liquid medium due to flashing.

Dewatering can take place before or after discharging the pellets from the crystallization liquid medium zone. For example, the slurry can be discharged from the liquid medium zone, optionally cooled and/or depressurized provided more than 1 atmosphere is maintained, and then subjected to dewatering. Some time can be taken to allow the pellets to cool by a flow through pipes simply exposed to ambient conditions. Alternatively, the slurry can be first dewatered in the liquid medium zone, followed by discharging the individual streams of pellets and liquid medium from the liquid medium zone. Since it is most preferred to dewater the slurry under about the same pressure as the pressure in the liquid medium zone, it is more efficient in this embodiment to either first crystallize, discharge the slurry from the liquid medium zone, and dewater the slurry in a second step under about the same pressure and temperature, or to both dewater the slurry in the liquid medium zone and discharge the pellets from the liquid medium zone. This way, the residence time of the pellets in the liquid medium after completing crystallization is nearly eliminated and these options are also less capital intensive.

The exact starting static pressure on the liquid medium and pellets (slurry) prior to dewatering is dependent upon the temperature, capital considerations, and other factors. During or after dewatering, however, the design pressure drop on the pellets will also depend on the polymer properties of the pellet to ensure that the pellet is sufficiently porous and/or rigid to maintain its structural integrity upon rapid depressurization. Those of skill understand that certain polyester polymers, such as polyethylene naphthalate, either absorb water quickly or do not allow the rapid escape of water entrained in the pellet structure or both, so that a rapid depressurization results in popcorning or other deformities. Thus, the process is designed to avoid pressure drops on the pellets which result deforming the pellet.

The form of the crystallization vessel used is not limited, so long as it is pressure and temperature rated for the vapor pressure generated in the liquid medium zone. The crystallization vessel is designed for a batchwise or a continuous process, preferably a continuous process. The crystallization vessel may be a pipe or a tank or a column, and may be oriented in any desired direction.

In one embodiment, the crystallization vessel may comprise a housing surrounding a pelletizer, preferably an underfluid pelletizer, to which is connected an appropriately sized and oriented pipe. In this embodiment, the molten polyester polymer is converted to a solid pellet by directing molten polyester polymer through a die, cutting the polyester polymer, and between the time the polyester polymer is directed through the die and before the polymer is introduced into the liquid medium, cooling at least the surface of the polyester polymer to below the $T_g$ of the polymer to convert the molten polyester polymer to a solid, followed by introducing the solid pellet into the liquid medium. The liquid medium and optionally but preferably the pelletizer are contained in a housing such that the pellets are introduced into the $\geqq 140°$ C. liquid medium while or shortly after the polyester polymer is cut. For example, as the polyester polymer is cut underfluid, the resulting pellets are in immediate contact with the liquid medium. Alternatively, the polyester polymer is cut by a pelletizer and as the polymer is cut, the resulting pellets drop from a distance into the liquid medium. In either case, the temperature of the polyester polymer is below the $T_g$ of the polymer, at least on the surface of the polymer, before the polyester polymer is introduced into the liquid medium, and preferably before the polyester polymer is cut to avoid clogging the cutting blades and gears or causing the polymer to agglomerate on the cutting surfaces. In an underfluid cutting method, a flow of cool liquid (e.g. below 90° C.) may be optionally introduced into the housing against the die plate face and/or against the cutting blades so as to quickly cool at least the surface of the molten polyester strands exiting the die orifices. In this way, the tendency of the molten polyester polymer to agglomerate on the die plate and/or cutting blades and gears is reduced. While the resulting pellets may then contact or drop into a zone of cool liquid medium insufficient to induce crystallization, the housing may also contain a hot zone of $\geqq 140°$ C. fluid without any physical barriers between the cool zone and the hot zone.

Whether or not an underfluid cutter is used, there is also provided an embodiment in which the pellets are crystallized in a pipe. In the event an underfluid cutter is used, the liquid medium advantageously circulates with a current directing the pellets away from the cutter into a pipe which is sized with a length and diameter sufficient to impart to the pellets the residence time necessary to crystallize the pellets to the desired degree of crystallization. Alternatively, the pipe may be insufficiently sized to provide the desired degree of crystallization because the pipe may serve only as a conduit to feed a crystallization tank or column, or the pipe may act to only partially crystallize the pellets and then feed a crystallization tank or column to complete the crystallization to the desired degree.

In any event, whether or not an underfluid cutter is used, the use of costly pressure rated crystallization tanks may be avoided by crystallizing the solid pellets in a pipe. The solid pellets may be crystallized in a pipe by directing a flow of solid pellets in a liquid medium through a pipe having an aspect ratio L/D of at least 15:1, wherein the solid pellets are crystallized in said pipe at a liquid medium temperature greater than the $T_g$ of the polyester polymer. A pipe may be distinguished from conventional vessels in that a pipe has an aspect ratio of length to diameter of greater than 15:1, preferably greater than 25:1, more preferably greater than 50:1. The length of the pipe having an aspect ratio of at least 15:1 is inclusive of a series of pipes joined by couplings, elbows, u-turn, bends, etc. In a pipe design, the liquid medium temperature is suitably about 90° C. or more. In a preferred embodiment, however, the pellets are crystallized in the pipe at a liquid medium temperature exceeding the boiling point of the liquid medium measured at 1 atmosphere. The boiling point will, of course, vary depending on the liquid medium composition. Whatever liquid medium composition is used, it is desirable to pressurize the pipe at or above the vapor pressure of the liquid medium. In a most preferred embodiment, the pellets are crystallized in said pipe at a liquid medium temperature of at least 140° C.

The pipe used in the process of the invention is designed to become the liquid medium zone in which crystallization occurs. While the pipe may be designed to provide partial or incomplete crystallization, or to finish off crystallization, it is preferred to use the pipe as the primary means for imparting to the pellets the desired degree of crystallization. This, in a preferred embodiment, solid pellets having a degree of crystallinity of no more than 15%, more preferably no more than 10% crystallinity, and most preferably not more than 5% crystallinity, are introduced into the pipe. The pellet degree of crystallinity may be measured at the point in time when the pellet is introduced to a liquid medium temperature in the pipe exceeding the $T_g$ of the polyester polymer pellets.

It is desirable to crystallize the pellets to at least a 30% degree of crystallization, more preferably to at least 35%, and most preferably to at least 40%. The residence time of the pellets in the pipe is sufficient to impart the desired degree of crystallinity. In the process of the invention, the pellets can be crystallized to 25% or more at a residence time of 15 minutes or less, or 10 minutes or less, and even 7 minutes or less. In one embodiment, the pellets are crystallized in the pipe to a degree of crystallization of 30% or more within 10 minutes or less and commencing with a solid pellet having a degree of crystallization of 10% or less and even 5% or less.

By using piping as the crystallization vessel, sticking may be avoided even in the absence of rotating mechanically induced agitation by creating a continuous flow of pellets through a pipe oriented horizontally or non-horizontally. As noted above, the pipe is preferably devoid of mechanically rotating paddles, and more preferably is devoid of in-line mixers, weirs, or baffles, and the flow of the liquid medium is desirably in the same direction as the flow of the pellets. The pipe may be filled with a slurry of liquid medium and pellets. Alternatively, the pipe may be filled with a vapor, the liquid medium and the pellets.

Instead of using a pipe or in addition to using a pipe as the crystallization vessel, the pellets may be crystallized in a tank or column. Referring to FIG. 32 as one example to illustrate one of the embodiments of a crystallization vessel, the crystallization can be carried out in a vertically oriented cylindrical column (1) (for convenience also referred to as a "vessel") within a liquid medium zone 1A where the pellets are traveling downward with gravity. The liquid medium is primarily fed through inlet (2A) and preferably distributed by any distribution means (2) such as a ring, a pipe, a pipe tree, or a series of nozzles around the circumference of the vessel. The particular design and equipment used for providing an upflow of water in a vessel is not limited. The liquid medium is desirably fed near the bottom of the vessel, and flows upward through the vessel, countercurrent to the direction of the falling pellets. The liquid medium zone is pressurized by the vapor generated from the liquid or byproducts present in the polyester such as acetaldehyde, inert gases fed to the vessel, pumps, compressors, hydrostatic head, or any combination of these. The pressure within the liquid medium zone is above the vapor pressure of the liquid medium. For example, the pressure within the liquid medium zone is 14 psia to 200 psia, and more typically, in the case water is used as the liquid medium, from 52 psia to 145 psia. The liquid medium is added to the liquid medium zone at the same pressure as within the liquid medium zone 1A.

The vessel is predominately filled with the liquid medium and pellets, and the liquid level (26) is at or near the top of the vessel. Each pellet falls through the liquid medium at a speed that can be approximately calculated from the well-known Stokes relationship. The settling velocity (the downward speed of the pellets relative to the liquid) is a function of the physical properties of the pellets (size, density, shape) and the liquid (density, viscosity). By adjusting the upward liquid velocity, the downward speed of the pellets with respect to the vessel can be controlled.

Pellets are added at the top of the vessel by a conventional solids or solids-liquid handling device (3), such as a rotary valve. The pellets may be added neat or as a slurry in the same or a different type of liquid medium as pumped into the vessel through feed inlet (2). The rate at which pellets are added to the top of the nearly liquid-filled vessel determines the proximity of one pellet to another. The proximity of pellets, or volume fraction pellets versus liquid, will influence the probability of one pellet sticking to another. The pellets should be fed in such a manner that they free-fall through the liquid medium with minimal contact with other pellets. Thus, a suitable volume fraction of pellets is less than 50%. The desired crystallization time and settling velocity will determine the height of the vessel that is necessary.

While the type of flow in the vessel is not limited, ideally, the liquid should travel upward through the vessel in approximate plug flow, that is, a uniform upward velocity across the cross-section of the vessel. Turbulent flow is acceptable, but large-scale vertical circulation patterns should be avoided. In order to achieve the goal of smooth upward flow, vanes or baffles (4) in the vessel can be used, but they should not interfere with the downward travel of the falling pellets. Examples of such internal structures are vertical, inclined, or nested annular rings (4) as illustrated. The liquid can be introduced to the crystallization vessel at multiple points (5,6) in order to obtain different superficial velocities in different sections of the crystallization vessel. The liquid distribution may be controlled by valves (17) or by pressure drop through the feed pipe and nozzles.

At the bottom of the vessel will be a settling section (7) with relatively low upward liquid velocity to create a high concentration of pellets for removal from the crystallization vessel. The upward liquid velocity and the level of pellets held up in the vessel are adjusted so that the volume fraction of the pellets discharged from the crystallization vessel is higher than the volume fraction of the pellets near the surface of the liquid medium or at the top of the crystallization vessel. By allowing the pellets to settle towards the bottom of the crystallization vessel, the volume fraction of the pellets is preferably increased to greater than 50% to minimize discharging excess liquid. Crystallized pellets with liquid in the interstices are removed from the vessel with a rotary valve (25) or by a set of dual knife-gate valves opened and closed in sequence. This embodiment illustrates a the preferred process embodiment described above wherein the pellets in step d) are removed from the liquid medium in a continuous mode and while the pellets are under a pressure equal to or greater than the vapor pressure of the liquid medium. It is preferred to remove a minimum amount of excess liquid along with the pellets because the process becomes more efficient by recirculating the bulk of the liquid medium through the pressurized recycle loop graphically illustrated as commencing through discharge pipe 8 through to the distribution ring 2 and/or 5. Once discharged from the crystallization vessel, the interstitial liquid medium must then be separated from the pellets by a conventional solid/liquid separation apparatus. Desirably, a gas is added to the interstitial spaces to remove excess liquid from the interstices as well as surface moisture. This process is as described earlier for Step d). Any of several types of known solid-liquid separation devices can accomplish this purpose, such as dryers, screeners, or coarse-mesh filters.

After the liquid medium reaches the top of the vessel, it can be recirculated into a pressurized recirculation loop by a pump (19) feeding the liquid medium through line (18) to feed the vessel with recirculated liquid medium. The continuous removal of the liquid medium from the liquid medium zone illustrates the more preferred embodiment mentioned above in that, by this means, the liquid medium can be continuously removed from the pellets, while the pellets are simultaneously and continuously separated from the liquid medium through, for example, a rotary valve or a set of dual knife-gate valves, at the bottom of the settling section of the crystallization vessel. Moreover, the pressure of the pellets is, simultaneous to their removal, at or above the vapor pressure of the liquid medium.

The discharge point of liquid medium from the vessel into the pressurized recirculation loop is located above the feed of liquid medium to the vessel. However, since the upward flow of the liquid medium above the discharge point is substantially diminished, the discharge point is desirably located at or above a point where an upward liquid flow velocity is no longer desired. To minimize the size of the vessel and maintain an upward flow throughout the liquid medium zone, the discharge outlet is preferably in closer proximity to the slurry feed inlet 3 than it is to the liquid medium feed inlet to the vessel. This liquid medium discharge outlet point is preferably located near the top of the vessel through an outlet pipe (8), such as within the top 25% of the vessel height, or even within the top 15% of the vessel height.

To prevent pellets from being carried into the discharge outlet pipe (8), one or a combination of the following designs can be employed. The vessel dimensions, internal design, and/or liquid flow velocity can be adjusted so that the liquid medium upward velocity in the outlet region (9)

is low enough so that pellets are not carried upward and out of the vessel through the outlet pipe (8). Two preferred designs for discharging a pellet-free liquid medium into the pressurized recirculation loop include a porous physical barrier (10) located anywhere in the vessel to prevent pellets from exiting with the liquid stream, and/or a larger-diameter annular region (11) of the vessel in which the liquid medium has a lower superficial velocity than through the smaller diameter main portion of the vessel below the annulus. Optionally, the pellets may be fed from the inlet 3 into a relatively stagnant pool (28) at the top of the vessel, created and defined by an annular ring (12) in which the liquid medium has no net upflow or cross-flow.

In the course of crystallization and heating of the pellets, some gases may be evolved. The crystallization vessel may be vented through an outlet vent pipe (13) by standard methods to provide for the removal of any generated gases if so desired. A pressure regulator or controller can be installed on this vent pipe. In order to minimize gases exiting the vessel with the liquid, the liquid outlet pipe (8) may contain a liquid seal leg (20).

In order to have a uniform downward flow of pellets through the liquid, an initial distributor is desired and preferred to spread the pellets over the cross-section of the vessel. This can be achieved either by contacting the pellets with a physical barrier to separate and spread the pellets (14), or through induced currents or jets (15) in the liquid stream after the pellets begin falling.

The temperature of the liquid is controlled by one or more external heat exchangers (16) on the liquid inlet or outlet liquid streams, and/or the liquid medium can be heated in a jacketed vessel. If multiple feed streams are used, multiple heat exchangers can be used to create crystallization zones of different temperatures.

In order to conveniently control the liquid level in the vessel and provide a uniform liquid feed for the pump (19), a small surge tank (21) may optionally be used. Liquid from the crystallization vessel (1) travels to the surge tank (21) through pipe (20). The vessel outlet pipe (20) is sized to be large enough so that it has a small pressure drop and the crystallization vessel liquid level (26) and the surge tank liquid level (27) are at nearly equal height relative to each other. A surge tank liquid overflow pipe (22) can be used to remove liquid during startup or if excess liquid is fed with pellets through inlet (3). Liquid makeup feed to the process enters by line (23), which may be used to control the liquid level in the surge tank (21). The surge tank is vented by line (24), which may be either nitrogen-blanketed or connected to a common vapor header with line (13) that vents the crystallization vessel. The pressure within the vessel (1) is maintained the same or on a substantially constant slope of pressure drop over the height of the liquid medium within the vessel by a pump (19) and pressure regulators (valves) and pressure sensing means at any suitable location, such as on vent lines (13) and (23), on make-up feed line (24), on the lines to the liquid medium feeds to ring distributors (5) and (2) and any other suitable location.

In a conventional process, 0.5 to about 0.69 It.V. pellets are crystallized in two fluidized beds using a countercurrent flow of air, followed by annealing in third vessel using nitrogen gas and then fed to separate vessel at higher temperatures and lower gas flow rate (nitrogen) than used in the crystallization zone to further polycondense the pellets in the solid state and thereby increase their weight-average molecular weight and corresponding It.V. to about 0.7 to 1.15, which is a costly process. In the process of the invention, high It.V. pellets in the range of 0.7 to 1.15 may be crystallized while avoiding the costly step of solid stating. Thus, in one embodiment of the invention, the process of steps a2) and b) may further comprise c) drying the crystallized PET pellets having an It.V. ranging from 0.7 to 1.15 in a drying zone at a zone temperature of at least 140° C., and d) introducing the dried pellets into an extrusion zone to form molten PET polymer, in the absence of a step for solid stating the pellets. By solid stating is meant any process, during or after crystallization and before the drying step conducted immediately prior to introducing the pellets into a melt extruder, which increases the molecular weight of pellets in the solid state.

Once the pellets are crystallized to the desired degree, they are transported to a machine for melt extruding and injection molding the melt into the desired shape, such as performs suitable for stretch blow molding into beverage or food containers, or extruding into another form such as sheet. In another embodiment of the invention, there is provided a process for making a container such as a tray or a bottle preform suitable for stretch blow molding comprising:

c) drying non-solid stated PET pellets having an It.V. ranging from 0.7 to 1.15 in a drying zone at a zone temperature of at least 140° C.;

d) introducing the dried pellets into an extrusion zone to form molten PET polymer; and e) forming a sheet, strand, fiber, or a molded part from extruded molten PET polymer.

In this embodiment, the pellets which are prepared for introduction into an extruder are not solid stated, yet have an It.V. sufficiently high such that the physical properties are suitable for the manufacture of bottle preforms and trays. The non-solid stated high It.V. pellets have been sufficiently crystallized to prevent them from significantly agglomerating in the dryer at high temperatures of 140° C. or more.

Dryers feeding melt extruders are needed to reduce the moisture content of pellets. After dewatering the pellets in the crystallizers, much of the remaining moisture on and in the pellets is driven off by drying the pellets. However, the pellets absorb ambient moisture during shipment from the manufacturer of the pellets to the converters who extrude the pellets into a mold with the desired shape. Further, not all the moisture in the pellet is driven off in a post crystallizer dryer since the need exists in any case to dry the pellets immediately prior to melt extruding. It is contemplated that the crystallized pellets dried after dewatering can be fed immediately to the melt extruder, thereby essentially combining both drying steps into a single drying step. In either case, however, prior to extrusion the pellets are dried at a temperature of 140° C. or more to drive off most all of the moisture on and in the pellet.

Dryers that effectively and efficiently reduce the moisture content and the acetaldehyde levels in the pellets are required immediately prior to melt extrusion. Moisture in or on pellets fed into a melt extrusion chamber will cause the melt to lose It.V. at melt temperatures by hydrolyzing the ester linkages with a resulting change in the melt flow characteristics of the polymer and stretch ratio of the preform when blown into bottles. While drying the pellets is a necessary step, it is desirable to dry the pellets at high temperatures to decrease the residence time of the pellets in the dryer and increase throughput. However, drying pellets at a temperature of 150° C. or more which have been crystallized at temperatures only of 100° C. or less will cause the pellets to agglomerate to each other, especially at the bottom of tall dryers where pellets experience the weight of the bed overhead.

In this embodiment, the drying is conducted at 140° C. or more, meaning that the temperature of the heating medium (such as a flow of nitrogen gas or air) is 140° C. or more. The use of nitrogen gas is preferred if drying is conducted above 180° C. to avoid oxidative thermal degradation. To dry at high temperatures while minimizing agglomeration in a conventional dryer equipped with or without an agitator, the pellets should be crystallized at a temperature greater than or equal to 40° C. below the drying temperature. It is preferred that the pellets used have been crystallized at 140° C. or more. In this way, there is wide flexibility to set the drying temperature at 140° C. if desired, or 150° C. or 160° C., and so on up to about 200° C. or less in the case the pellets have been crystallized at temperatures of 180° C. However, prudence would suggest setting the actual operational drying temperature at no more than about 40° C. above the crystallization temperature to minimize the risk of agglomeration and to leave a temperature cushion to take into account hot spots in the dryer and allow for temperature fluctuations which may occur from time to time.

In conventional processes which crystallize low It.V. amorphous pellets in a gaseous fluidized bed, it is necessary to solid state the pellets to render them suitable for extrusion into molded parts such as preforms suitable for beverage containers. In this embodiment, pellets having an It.V. of 0.7 to 1.15 It.V. which have not been solid stated are dried at high temperatures of 140° C. or more. The process of this embodiment has the advantage of allowing drying at high temperature using pellets which have not been subjected to a costly solid stating step. Moreover, the incidence of agglomeration is reduced relative to the amount of agglomeration occurring in a dryer under the same operating conditions using pellets having the same It.V. and crystallized at a temperature of less than 120° C.

In general, the residence time of pellets in the dryer at 140° C. or more will on average be from 0.5 hours to 16 hours. Any conventional dryer can be used. The pellets may be contacted with a flow of heated air or inert gas such as nitrogen to raise the temperature of the pellets and remove volatiles from inside the pellets, and may also be agitated by a rotary mixing blade or paddle. The flow rate of the heating gas, if used, is a balance between energy consumption, residence time of pellets, and preferably avoiding the fluidization of the pellets. Suitable gas flow rates range from 0.05 to 100 scfm for every pound per hour of pellets discharged from the dryer, preferably from 0.2 to 5 scfm per lb. of pellets.

Once the pellets have been dried, they are introduced into an extrusion zone to form molten polyester polymer, followed by extruding the molten polymer and forming a molded part, such as a bottle preform (parison) through injecting the melt into a mold or into a sheet or coating. Methods for the introduction of the dried pellets into the extrusion zone, for melt extruding, injection molding, and sheet extrusion are conventional and known to those of skill in the manufacture of such containers.

At the melt extruder, or in the melt phase for making the polyester polymer, other components can be added to the composition of the present invention to enhance the performance properties of the polyester polymer. These components may be added neat to the bulk polyester or can be added to the bulk polyester as a concentrate containing at least about 0.5 wt. % of the component in the polyester let down into the bulk polyester. The types of suitable components include crystallization aids, impact modifiers, surface lubricants, stabilizers, denesting agents, compounds, antioxidants, ultraviolet light absorbing agents, metal deactivators, colorants, nucleating agents, acetaldehyde reducing compounds, reheat rate enhancing aids, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art and do not require extensive discussion. Any of these compounds can be used in the present composition.

While an embodiment has been described for the drying of pellets which have not been solid stated, it is also contemplated that pellets which have optionally been solid stated are also dried at temperatures of 140° C. or more. Not only may containers be made from pellets crystallized according to the process of this invention, but other items such as sheet, film, bottles, trays, other packaging, rods, tubes, lids, filaments and fibers, and other injection molded articles. Beverage bottles made from polyethylene terephthalate suitable for holding water or carbonated beverages, and heat set beverage bottle suitable for holding beverages which are hot filled into the bottle are examples of the types of bottles which are made from the crystallized pellet of the invention.

This invention can be further illustrated by the following examples of preferred embodiments thereof, although it will be understood that these examples are included merely for purposes of illustration and are not intended to limit the scope of the invention.

EXAMPLES

In each example, Differential Scanning Calorimetery data, and Gel Permeation Chromatography data are provided to describe the results obtained by crystallizing polyethylene terephthalate pellets from the glass in water as the liquid medium at various temperatures.

The DSC analysis to determine the initial melting point of the crystallized pellets was conducted according to the following procedure in each case:

Using a Mettler DSC821 instrument, the first heating scan was performed on a sample weighing 9–10 mg and with a heating rate of 20° C./min. Unless otherwise stated, the degree of crystallization in each case was also determined using the same DSC scan. In the first heating scan, the sum of the areas under any crystallization peaks was subtracted from the absolute value of the sum of the areas under any melting peaks. The difference was divided by 120 J/g (theoretical heat of fusion for 100% crystalline PET) and multiplied by 100 to obtain the percent crystallinity.

Results of DSC scans are reported as, and the percent crystallinity is calculated from both of:

Low peak melting point: $T_{mla}$

High peak melting point: $T_{mlb}$

Note that in some cases, particularly at low crystallinity, rearrangement of crystals can occur so rapidly in the DSC instrument that the true, lower melting point is not detected. The lower melting point can then be seen by increasing the temperature ramp rate of the DSC instrument and using smaller samples. A Perkin-Elmer Pyris-1 calorimeter was used for high-speed calorimetry. The specimen mass was adjusted to be inversely proportional to the scan rate. About a 1 mg sample was used at 500° C./min and about 5 mg were used at 100° C./min. Typical DSC sample pans were used. Baseline subtraction was performed to minimize the curvature in the baseline.

In some cases where noted, percent crystallinity was also calculated from the average gradient tube density of two to three pellets. Gradient tube density testing was performed according to ASTM D 1505, using lithium bromide in water.

The GPC analysis to determine the estimated Ih.V. of the pellets was conducted according to the following procedure in each case:

Solvent: 95/5 by volume methylene chloride/hexafluoroisopropanol+0.5 g/l tetraethylammonium bromide
Temperature: ambient
Flow rate: 1 ml/min
Sample solution:
  4 mg PET in 10 ml methylene chloride/hexafluoroisopropanol azeotrope (~70/30 by vol)+10 µl toluene flow rate marker. For filled materials, the sample mass is increased so that the mass of polymer is about 4 mg, and the resulting solution is passed through a 0.45 µm Teflon filter.
Injection volume: 10 µl
Column set: Polymer Laboratories 5 µm PLgel, Guard+ Mixed C
Detection: UV absorbance at 255 nm
Calibrants: monodisperse polystyrene standards, MW=580 to 4,000,000 Universal calibration parameters: (see note below)
  PS K=0.1278 a=0.7089
  PET K=0.4894 a=0.6738

The universal calibration parameters above were determined by linear regression to yield the correct weight average molecular weights for a set of five PET samples previously characterized by light scattering.

Calculation of inherent viscosity at 0.5 g/dl in 60/40 phenol/tetrachloroethane from the weight-average molecular weight is determined as follows:

$$IhV = 4.034 \times 10^{-4} <M>_w^{0.691}$$

The solution viscosity relates to the composition and molecular weight of a polyester. Although the IhV numbers for the crystallized products were estimated by GPC, unless otherwise noted, the solution viscosity measurements were made on the starting materials, i.e., amorphous pellets. The following equations describe the solution viscosity measurements and subsequent calculations as performed for PET.

$$\eta_{inh} = [\ln(t_s/t_o)]/C$$

where
$\eta_{inh}$=Inherent viscosity at 25° C. at a polymer concentration of 0.50 g/100 mL of 60 wt. % phenol and 40 wt. % 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0}(\ln \eta_r)/C$$

where
$\eta_{int}$=Intrinsic viscosity
$\eta_r$=Relative viscosity=$t_s/t_o$
$\eta_{sp}$=Specific viscosity=$\eta_r - 1$ Instrument calibration involves replicate testing of a standard reference material and then applying appropriate mathematical equations to produce the "accepted" I.V. values.

Calibration Factor=Accepted Target IhV of Reference Material/Average of Replicate Determinations The uncorrected inherent viscosity ($\eta_{inh}$) of each sample is calculated from the relative viscometer (Model Y501) using the following equation:

$$\eta_{inh} = \frac{\ln(P2/KP_1)}{C}$$

where:
P2=The pressure in capillary P2
P1=The pressure in capillary P1
C=Concentration of the polymer in g/100 mL of Solvent
K=Viscosity constant obtained from baseline reading
ln=Natural logarithm Corrected IhV=Uncorrected Ih.V.×Calibration Factor The intrinsic viscosity (ItV or $\eta_{int}$) may be estimated using the Billmeyer equation as follows:

$$\eta_{int} = 0.5[e^{0.5 \times Corrected\ IhV} - 1] + 0.75 \times Corrected\ IhV$$

Comparative Example 1

In this example and in Comparative Example 2, amorphous PET pellets with an It.V. of 0.779 dL/g (0.74 IhV as measured) were used as the pellet subjected to crystallization. Fifty pellets weighed about 0.9 grams. 200 grams of the amorphous pellets were subsequently dropped into a vessel containing 500 g of water preheated to 100° C. Samples of pellets were withdrawn from the boiling water at different listed intervals and immediately quenched in near freezing water to avoid further crystallization for the purpose of determining the degree of crystallization in this experiment. The quenched pellet samples and water were poured onto a sieve, patted with a cloth to remove surface residual water, and then left on the sieve to air dry for a few hours. Then the pellets were held in a container under a vacuum of about 28 in. Hg for 24 hours to remove more water from the pellets. The absence of heat in this drying step was to prevent the pellets from crystallizing further after the water treatment.

Each of the samples were submitted to DSC and Ih.V. analysis as described at the beginning of this Example.

Figure 1:
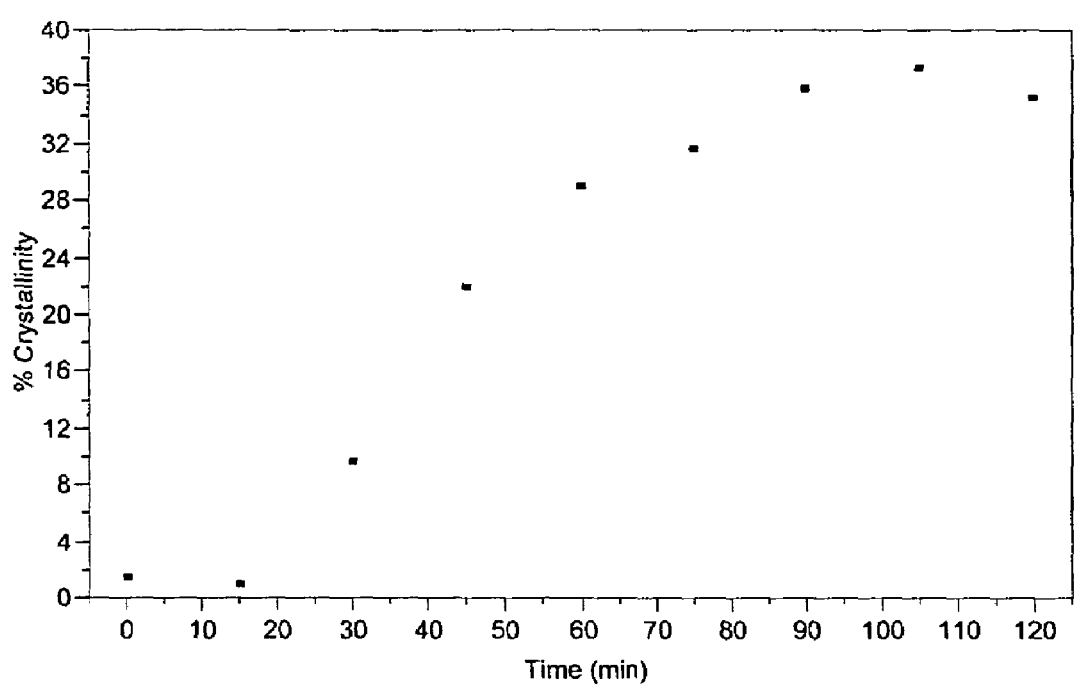
FIG. 1 is a graphical plot setting forth the results of a DSC scan to indicate the degree of crystallization in each sample taken out of the water at about 100° C. at periodic intervals given in minutes.

FIG. 1 is a graphical plot setting forth the results of a DSC scan to indicate the degree of crystallization in each sample taken out of the boiling water at periodic intervals given in minutes. As can be seen, it took about 15 minutes to initiate crystallization of 0.779 dL/g It.V. pellets in boiling water, and about 50 minutes to obtain a degree of crystallization of 25%.

Figure 2:
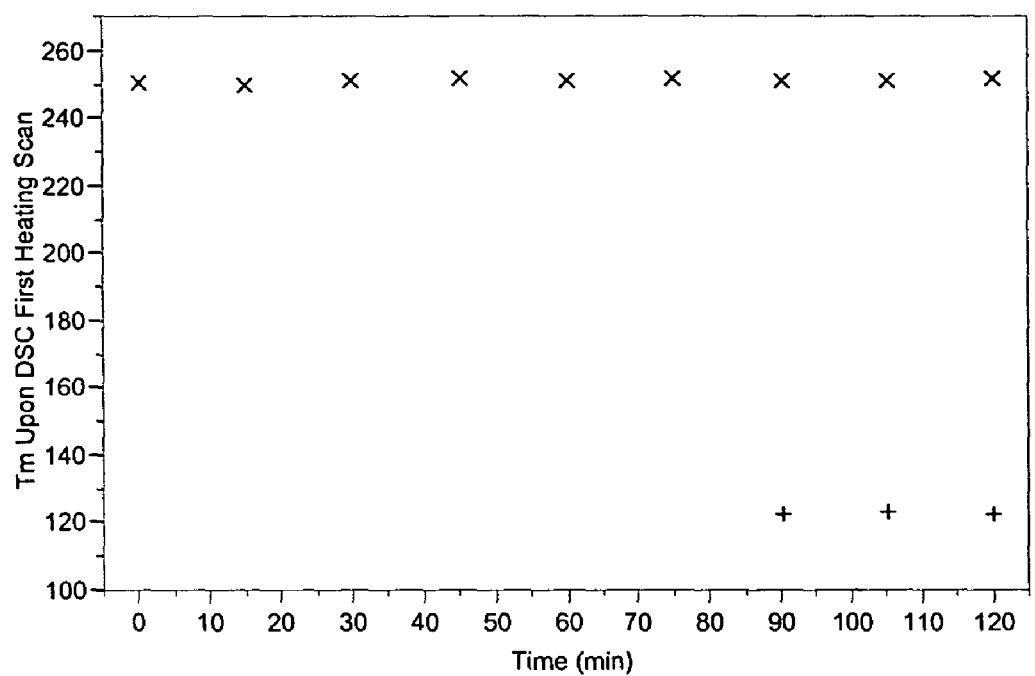
FIG. 2 is a graphical plot of the high melt point of pellets crystallized in water at about 100° C. over time.

Semicrystalline materials may exhibit two or more melting endotherms in DSC experiments. An increase in DSC scanning rate increases the area of the low temperature peak with respect to high one. The melting-recrystallization theory assigns the lower melting peak(s) to isothermally crystallized crystals (like those formed during treatment with a liquid at a given temperature), and the higher melting peak to the melting and recrystallization of the crystals induced by DSC scanning. The lowest melting point is an important data point as this melting point will indicate the point at which the there exists a risk of agglomerating the pellets at the drying temperature. In this case, as seen in FIG. 2, the pellets that were crystallized for more than 75 minutes had a low melt point at 120° C. on the first heating scan ($T_{mla}$) as represented by the data points marked with an "+". The data points indicated with a "x" represent the high peak melting point of the pellet samples ($T_{mlb}$). For those samples crystallized less than 75 min., the polymer pellets are thought to have partially melted and recrystallized rapidly during the 20° C./min. DSC scan so that its low melting point could not be seen. As the DSC time scale is shortened, however, a lower melting peak might be seen.

Figure 3:
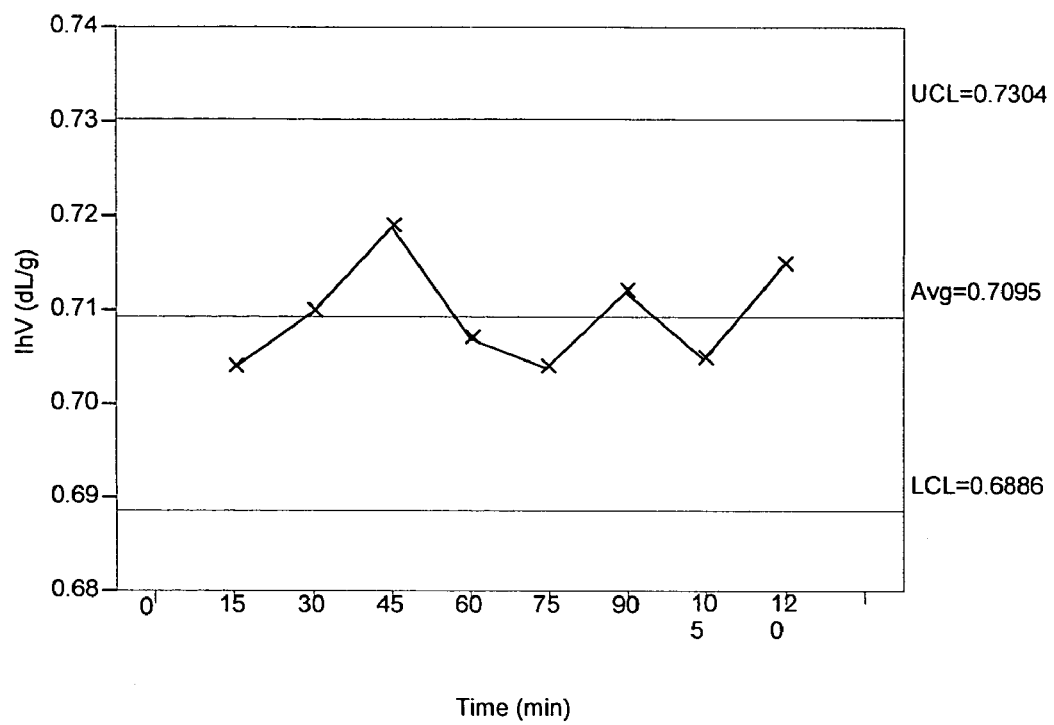
FIG. 3 is a graphical plot of the pellet Ih.V. loss in water at about 100° C. over time.

As seen in FIG. 3, in each sample, no significant loss of Ih.V. was observed.

Comparative Example 2

In this example, the same pellets as used in Comparative Example 1 were crystallized in a pressure reactor at 125° C. To a reactor having a volume of about 3.3 L were added 1300 g of water and 200 g of pellets. The reactor was pressurized to 30 psig by nitrogen, and the contents of the reactor were heated to 125° C. starting from ambient temperature over a period of 20 minutes. The pellets were held underwater at 125° C. for 1 hour. Subsequently, the reactor was cooled below 80° C. and depressurized to atmospheric pressure. The pellets and water were removed from reactor by opening the drain valve. To remove residual pellets, the reactor was rinsed several times with ambient water. The pellets were isolated by filtration using a 20 mesh sieve, patted dry with a towel, and held without heat under full vacuum (~28 in. Hg) for about 2 days to remove more water from the pellets.

The degree of crystallization was measured to be about 35%. A first batch of the crystallized pellets was subjected to a first heating scan by DSC and for IhV testing to calculate the It.V. of the pellets. The Ih.V. of the pellets was determined to be 0.69 dL/g, the It.V. of the pellets was calculated to be 0.7235 dL/g, and the low melting point of the pellets was determined to be about 155° C.

A second 30 gram batch of the crystallized pellets was arranged into a pan that was about 2.75 inches in diameter. A 5 lb. weight, which was 2.5 inches in diameter, was placed on top of the pellets. The pellets were placed in a preheated at 150° C. oven for 5 h with a nitrogen purge to simulate the drying conditions of a dryer associated with a melt extruder. Minimal sticking was observed. However, the pellets continued to crystallize and anneal under these conditions from a degree of crystallinity of 35 to about 37.5%, thereby increasing the lower melting point of the pellets from 155 to about 166.5° C. as measured by a first DSC heating scan.

Example 3

Three additional experiments were conducted by heating pellets at 140° C. in this Example, 150° C. in Example 4, and 180° C. in Example 5, each according to the following procedure. For the remaining examples, fifty of the pellets used had a weight of about 0.8 g.

In each of Examples 3, 4, and 5, the crystallization of the pellets was conducted according to the following procedure. An amorphous single pellet having an Ih.V. of 0.80 dL/g and a calculated It.V. of 0.846 dL/g was placed into a PerkinElmer O-ring sealed, stainless steel DSC pan (part # 0319-0218), along with two drops of Millipore water. A circulating silicone oil bath was preheated to the temperature of the experiment. The DSC pan was placed into the hot oil bath and held in the bath for a time stated below in FIG. 4. The DSC pan with the o-ring contained the internal pressure that developed during the heating phase. After the allotted time, the pan was removed from the bath, excess oil was removed quickly with a towel, and the pan was put in near-freezing water to quench or stop crystallization. The pan was cut open, the pellet was towel-dried, and then placed into a desiccator for 24 hours with the lid cracked open to accommodate a rapid dry nitrogen purge. This procedure was repeated for each pellet for the next identified crystallization time at the same temperature. Pellets were tested at each crystallization time interval set forth in FIG. 4 at 140° C. The same process was repeated for testing pellets at 150° C. and at 180° C. in water, except that at 180° C. in water, the pellets were dried at about 84° C. and 29 in. of Hg for 2.5 days.

Figure 4:
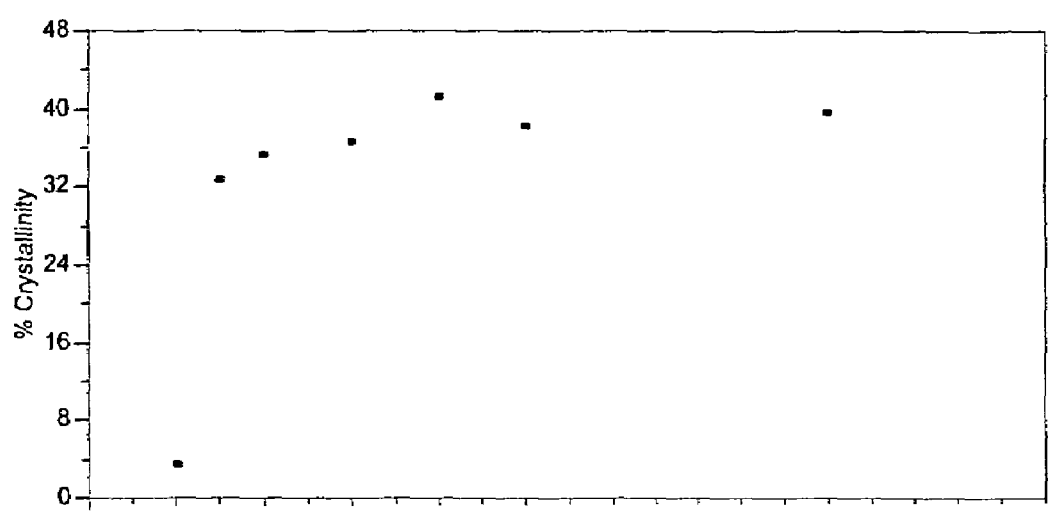
FIG. 4 is a graphical plot of the degree of crystallization achieved by crystallizing pellets at 140° C. in water over time.
Figure 5:
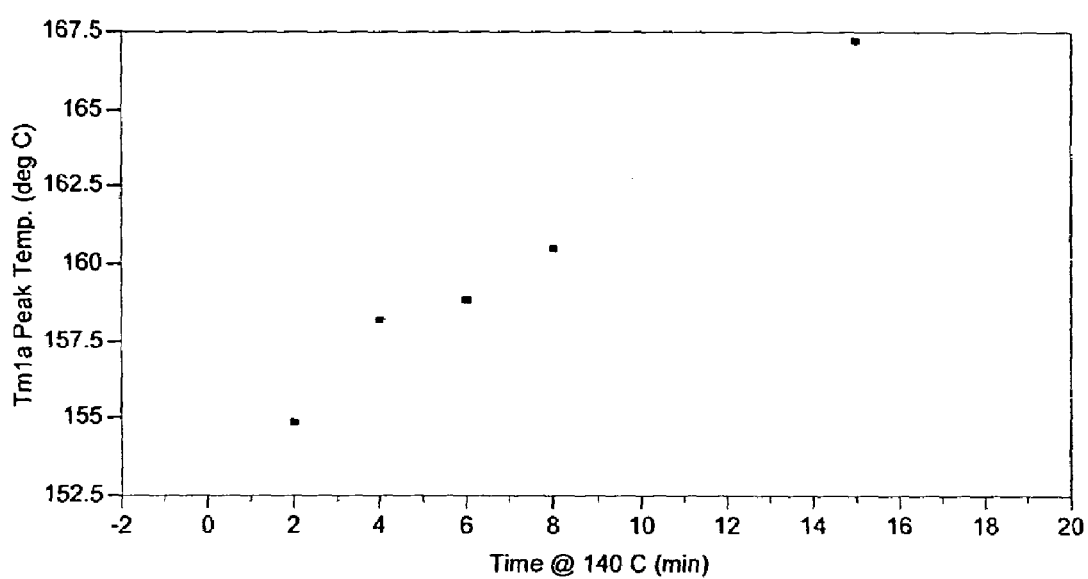
FIG. 5 is a graphical plot showing the low peak melt temperature of pellets crystallized over time at 140° C. in water.
Figure 6:
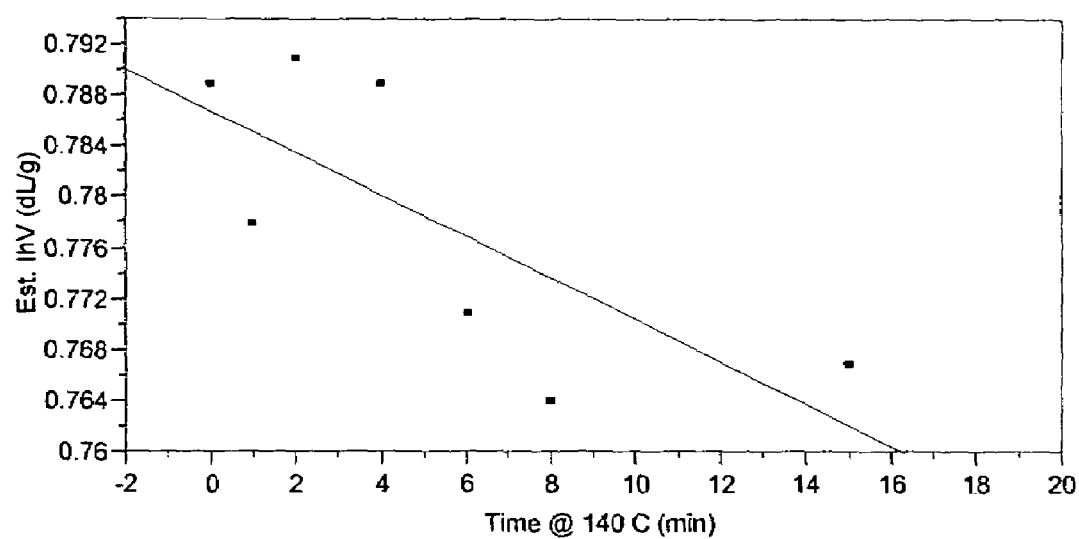
FIG. 6 is a graphical plot showing the Ih.V. loss of pellets crystallized over time at 140° C. in water.

Each pellet at each crystallization time and at each temperature was analyzed for their degree of crystallization, their thermal behavior, and their calculated Ih.V via GPC. FIGS. 4 through 6 set forth the results.

According to FIG. 4, the pellets crystallized in water at 140° C. achieved a degree of crystallization in excess of 30% in less than two minutes. FIG. 5 shows that pellets crystallized at 2 to 4 minutes exhibited a low peak melting temperature by DSC from between about 155 and about 158° C. Moreover, the crystallization conditions did not induce molecular weight build up as can be seen from FIG. 6. Per a linear fit of the estimated Ih.V. data over a 15 min. interval at 140° C. the Ih.V. loss was predicted to be 0.00164 dL/g per minute.

Example 4

Figure 7:
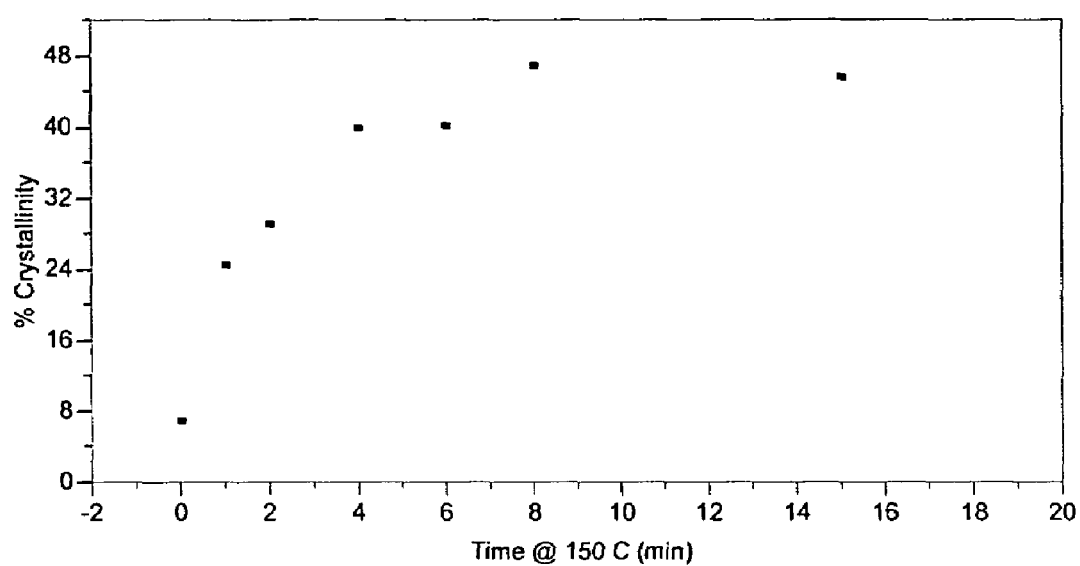
FIG. 7 is a graphical plot of the degree of crystallization achieved by crystallizing pellets at 150° C. in water over time.
Figure 8:
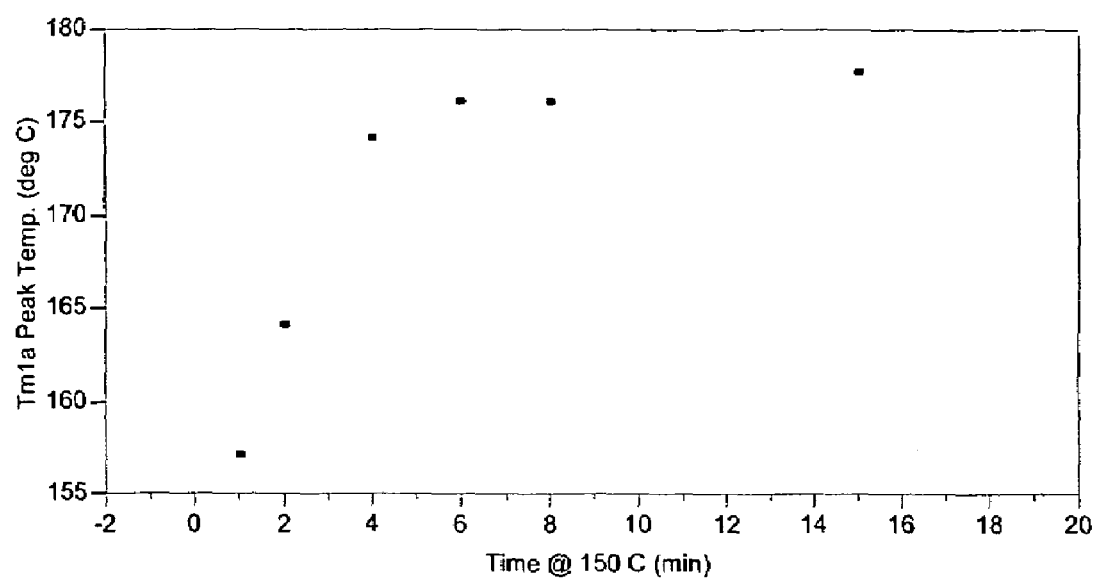
FIG. 8 is a graphical plot showing the low peak melt temperature of pellets crystallized over time at 150° C. in water.
Figure 9:
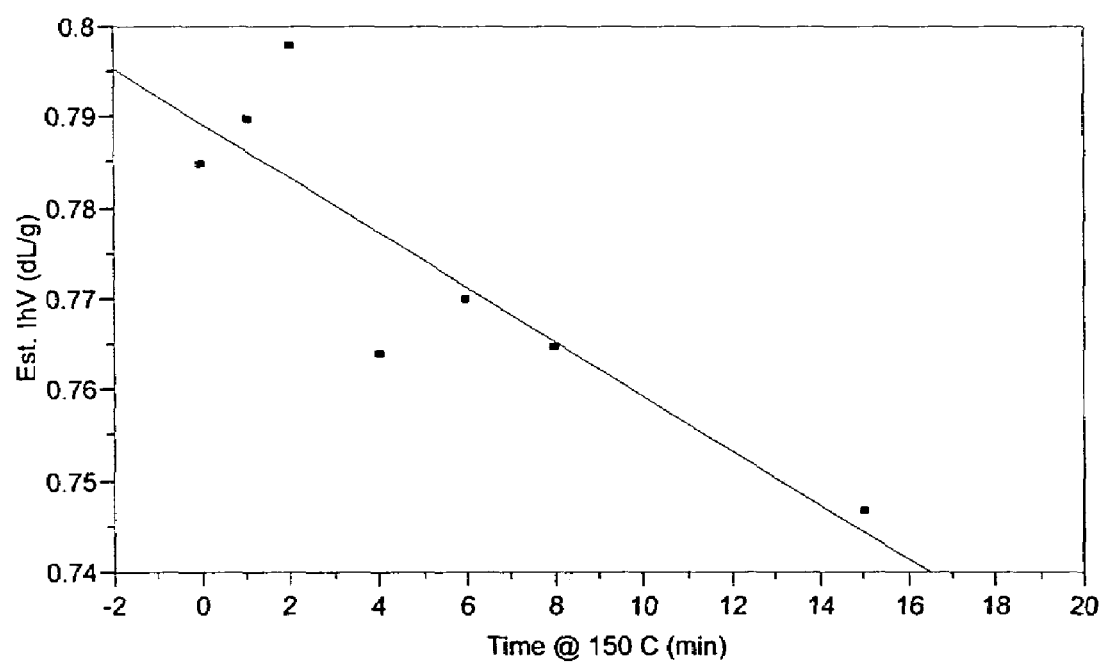
FIG. 9 is a graphical plot showing the Ih.V. loss of pellets crystallized over time at 150° C. in water.

According to FIG. 7, pellets crystallized in water at 150° C. also achieved a degree of crystallization in excess of 25% in less than two minutes, and also reached around 29% in about two minutes. FIG. 8 shows that pellets crystallized at 2 to 4 minutes exhibited an initial melting temperature by DSC from between about 157 and 178° C. Moreover, the crystallization conditions did not induce molecular weight build up as can be seen from FIG. 9. Per a linear fit of the estimated Ih.V. from GPC data over a 15 min. interval at 150° C., the Ih.V. loss was predicted to be 0.00300 dL/g per minute.

Figure 10:
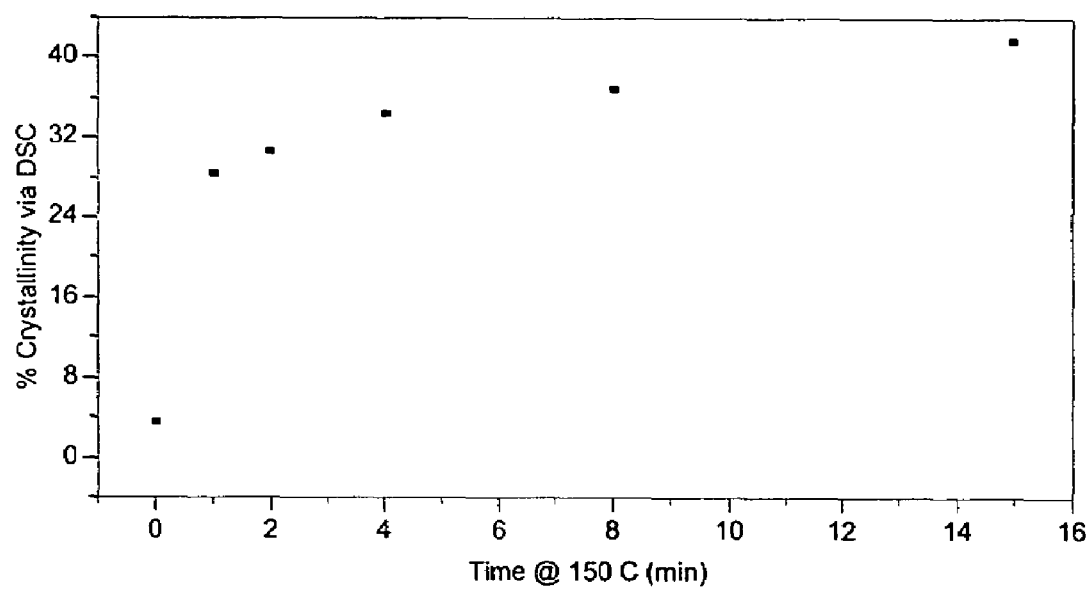
FIG. 10 is a graphical plot of the degree of crystallization achieved by crystallizing pellets at 150° C. in water over time.
Figure 11:
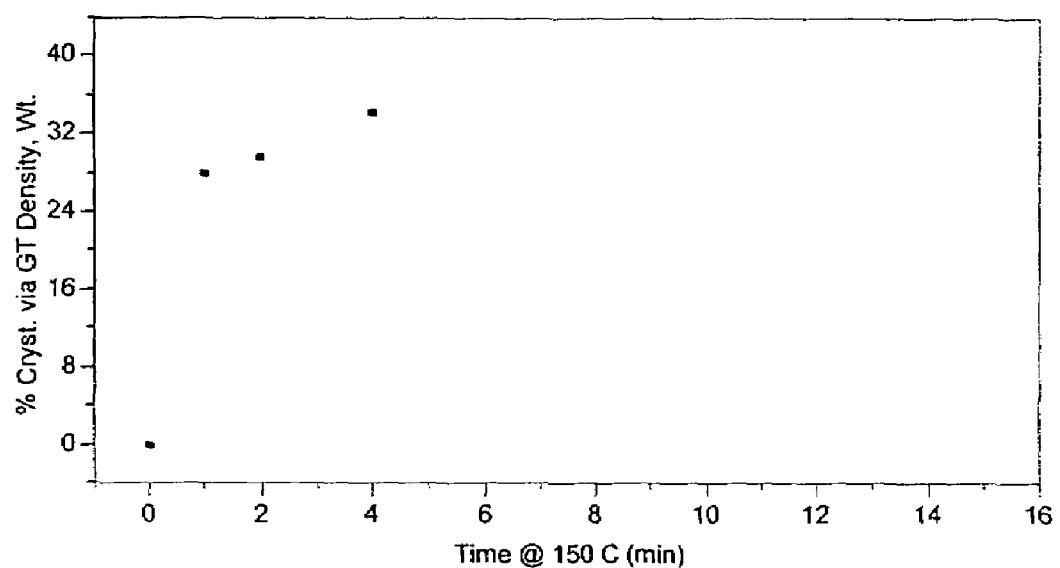
FIG. 11 is a graphical plot showing the degree of crystallinity by wt. % density of pellets crystallized over time at 150° C. in water.

The crystallization in water at 150° C. was replicated and tested for crystallinity by DSC and in addition, crystallinity was calculated from the density of the pellets. According to FIG. 10, pellets crystallized in water at 150° C. also achieved a degree of crystallization in excess of 25% in less than two minutes, and also reached around 28.5% in about two minutes. A gradient tube density was tested on 2–3 pellets treated for 0, 1, 2 and 4 min. FIG. 11 shows the wt. % crystallinity calculated from the density of the pellets.

Figure 12:
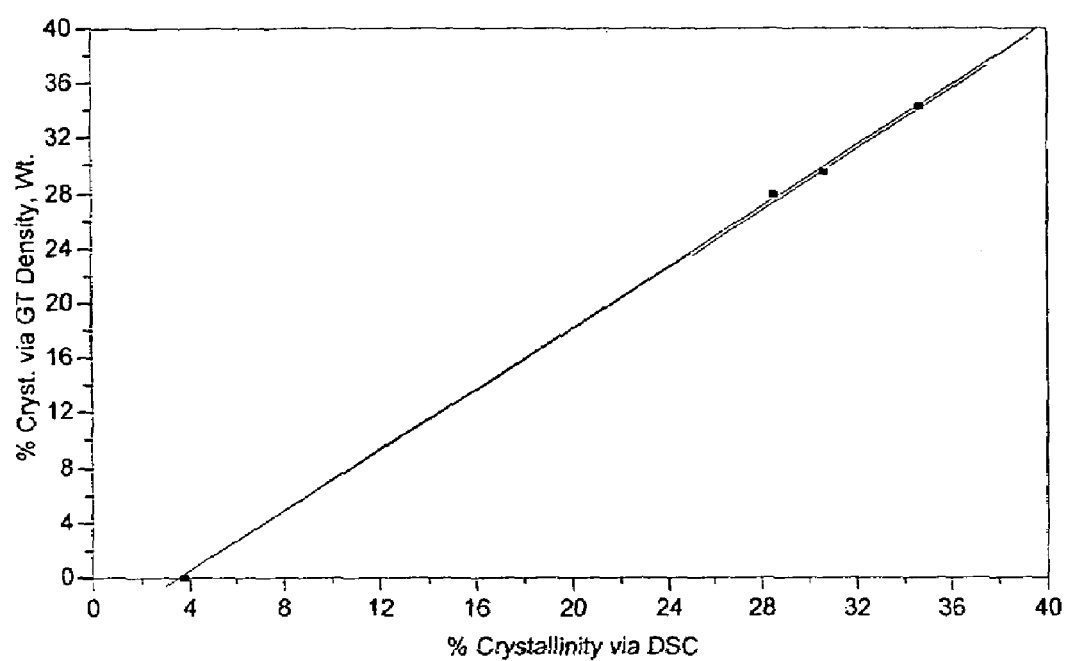
FIG. 12 shows the % crystallinity determined by the DSC technique versus the % crystallinity determined by the density technique of pellets crystallized in water at 150° C. over time.

FIG. 12 shows the % crystallinity determined by the DSC technique versus the % crystallinity determined by the density technique. According to this dataset, the two tests are very highly correlated (coefficient=0.9998). The linear fit between the percent crystallinity as determined by the density method and the percent crystallinity by the DSC method followed the equation:

% Cryst. via GT Density, Wt.=−4.0134+1.1104158% Crystallinity via DSC

Figure 13:
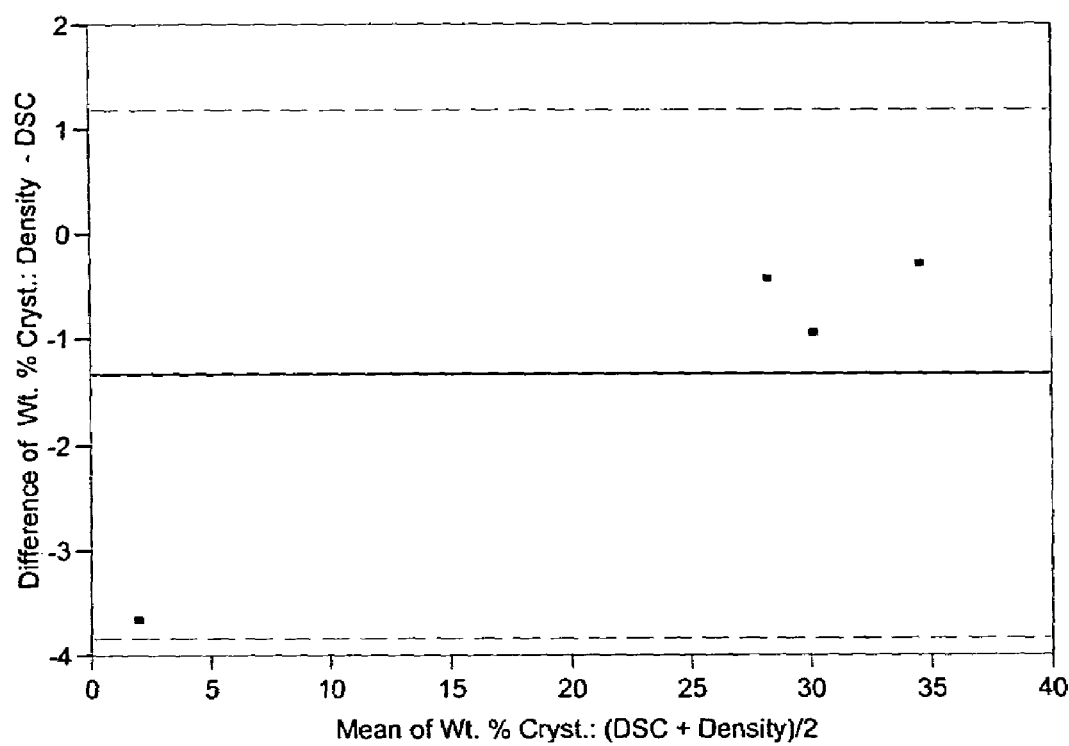
FIG. 13 is a graphical plot showing how the difference between the density method and the DSC method for calculating crystallinity decreased as the % crystallinity increased.

FIG. 13 shows how the difference between the two methods decreased as the % crystallinity increased. FIG. 14 shows that pellets crystallized from 2 to 4 minutes exhibited an initial melting temperature by DSC from between about 161 and 174.5° C. Moreover, the crystallization conditions did not induce molecular weight build up as can be seen from FIGS. 15 and 16. Instead, the data points in FIGS. 15 and 16 indicate that some measure of IV loss occurred. A linear fit of the estimated Ih. V. data over a 15 min. interval at 150° C. was also made and plotted on the graph of FIG. 15. The Ih.V. loss was predicted to be 0.00211 dL/g per minute. The same prediction was plotted in FIG. 16 for the It.V. loss. Per a linear fit of the estimated It.V. data over a 15 min. interval at 150° C., the It.V. loss was predicted to be 0.002375 dL/g per minute.

Example 5

At 180° C., crystallization was almost immediate as shown in FIG. 17. Within a minute or less, primary crystallization was obtained to a degree of crystallization at a 30% or more value. Pellets crystallized at 125° C., 140° C. and 150° C. exhibited initial melting points about 20 to 25° higher than their corresponding crystallization temperatures. However, as can be seen from FIG. 18, the lower melting temperature was between 212 to 216° C. for pellets crystallized longer than 2 minutes, representing a 30–35° C. increase over the crystallization temperature of 180° C. As shown in FIG. 19, a linear fit of the estimated Ih.V. data over a 15 min. interval at 180° C. predicted the Ih.V. loss to be 0.01486 dL/g per minute. Accordingly, at higher crystallization temperatures, it is desirable to crystallize for only a short time to avoid significant Ih.V. and It.V. losses.

Example 6

Amorphous PET pellets having an Ih.V. of 0.80 dL/g and a calculated It.V. of 0.846 dL/g were used in this example. The underliquid crystallization was performed with triethylene glycol (TEG) as the liquid. Equipment used included 1 L metal beaker and its heating mantle, 3-blade stirrer attached via a chuck, a variac, and a portable temperature readout to monitor the temperature. The pellets were crystallized according to the following procedure:

Six pellets were placed in each of 15 wire baskets made with wire hooks to hold the PET pellets. A firmly clamped beaker containing 500 mL of TEG and a stirrer at the bottom of the beaker was partially covered at the top around the edges with Al foil. The TEG was heated and stirred by slowly increasing the output on the variac until the temperature was within ±2° C. of the target. In the meantime, a cold-water bath was prepared to a temperature of 5–10° C. to quench the samples when removed. When the TEG reached 150° C., the wire of the first sample basket was hooked around the edge of the beaker, and sample basket was well above the stirrer, and a stopwatch was started. The next four sample baskets were also hooked onto the edge of the beaker and immersed in the TEG bath. A sample in a basket was heated for the different listed intervals and withdrawn at the allotted time. Each sample was briefly dabbed on a towel to remove excess TEG, and quickly placed in a cold-water bath to quench or stop crystallization. The samples were kept in a cold water bath for about 5 min. After cooling, the pellets were washed with warm water (not hot) to remove residual TEG, and patted dry. The pellets were further dried in a desiccator for 24 hours with the lid cracked open to accommodate a rapid dry nitrogen purge.

According to FIG. 20, pellets crystallized in TEG at 150° C. also achieved a degree of crystallization in excess of 25% in less than two minutes, and also reached around 30% in about two minutes. FIG. 21 shows that pellets crystallized at 2 to 4 minutes exhibited an initial melting temperature by DSC about 161° C. Moreover, the crystallization conditions did not induce molecular weight build up as can be seen from FIG. 22. Per a linear fit of the estimated Ih.V. data over a 15 min. interval at 150° C., the Ih.V. loss was predicted to be 0.00086 dL/g per minute. The estimated Ih.V. of the starting pellet was 0.786 dL/g. As compared to the 150° C. example in water (Example 4), there was much less Ih.V. loss over 15 min. in 150° C. TEG than in 150° C. water. Glycolysis appeared to occur to a lesser extent at 150° C. than hydrolysis did.

Example 7

The same procedure was followed as in Example 6, except that the target temperature was set to 160° C.

According to FIG. 23, pellets crystallized in TEG at 160° C. also achieved a degree of crystallization in excess of 25% in less than two minutes, and also reached around 30% in about four minutes. FIG. 24 shows that pellets crystallized at 2 to 4 minutes exhibited an initial melting temperature by DSC from between about 171° C. to 173.5° C. Moreover, the crystallization conditions did not induce molecular weight build up as can be seen from FIG. 25. Per a linear fit of the estimated Ih.V. data over a 15 min. interval at 160° C. the Ih.V. loss was predicted to be 0.00195 dL/g per minute. The estimated Ih.V. of the starting pellet was 0.786 dL/g.

Example 8

The same procedure was followed as in Example 6, except that the target temperature was set to 170° C.

According to FIG. 26, pellets crystallized in TEG at 170° C. also achieved a degree of crystallization in excess of 25% in less than two minutes, and also reached around 28% in about two minutes. FIG. 27 shows that pellets crystallized at 2 to 4 minutes exhibited an initial melting temperature by DSC from between about 179.5° C. to 181° C. Moreover, the crystallization conditions did not induce molecular weight build up as can be seen from FIG. 28. Per a linear fit of the estimated Ih.V. data over a 15 min. interval at 170° C. the Ih.V. loss was predicted to be 0.00289 dL/g per minute. The estimated Ih.V. of the starting pellet using GPC was 0.786 dL/g. The rate of Ih.V. loss in 170° C. TEG was similar to that in water twenty degrees cooler (150° C.).

Example 9

The same procedure was followed as in Example 6, except that the target temperature was set to 180° C.

According to FIG. 29, pellets crystallized in TEG at 180° C. also achieved a degree of crystallization in excess of 25% in less than two minutes, and also reached around 32% in about two minutes. FIG. 30 shows that pellets crystallized 4 minutes exhibited an initial melting temperature by DSC of about 191° C. Moreover, the crystallization conditions did not induce molecular weight build up as can be seen from FIG. 31. Per a linear fit of the estimated Ih.V. data over a 15 min. interval at 180° C. the Ih.V. loss was predicted to be 0.00555 dL/g per minute. The observed Ih.V. loss of pellets crystallized for 15 minutes was 0.081 dL/g, as compared to a calculated IV loss over 15 min. of 0.083 dL/g. As compared to the 180° C. example in water (Example 5), there was much less Ih.V. loss over 15 min. in 180° C. TEG than in 180° C. water. Glycolysis appeared to occur to a lesser extent at 180° C. than hydrolysis did.

What we claim is:

1. A process for thermally crystallizing solid polyester polymer pellets in a pipe comprising directing a flow of solid pellets in a liquid medium continuously through a pipe having an aspect ratio L/D of at least 15:1, wherein the solid pellets are crystallized in the pipe at a liquid medium temperature greater than the $T_g$ of the polyester polymer.

2. The process of claim 1, wherein the pellets are crystallized in said pipe at a liquid medium temperature exceeding the boiling point of the liquid medium at 1 atmosphere.

3. The process of claim 1, wherein the pellets are crystallized in said pipe at a liquid medium temperature of at least 140° C.

4. The process of claim 1, wherein the pellets and liquid medium in said pipe are under a pressure equal to or greater than the vapor pressure of the liquid medium.

5. The process of claim 1, comprising introducing said polyester pellets having a degree of crystallinity of no more than 15% into said pipe.

6. The process of claim 5, comprising introducing said solid pellets having a degree of crystallinity of no more than 10% into said pipe.

7. The process of claim 1, wherein the pipe has an aspect ratio L/D of at least 25:1, the pellets are crystallized in said pipe at a liquid medium temperature of at least 140° C., the pellets and liquid medium in said pipe are under a pressure equal to or greater than the vapor pressure of the liquid medium, and the pellets.

8. The process of claim 7, comprising introducing said solid pellets having a degree of crystallinity of no more than 15% into said pipe.

9. The process of claim 8, comprising crystallizing said solid pellets in said pipe to a degree of crystallinity of at least 30%.

10. The process of claim 1, comprising introducing said solid polyester pellets having a degree of crystallinity of 15% or less into said pipe and crystallizing said pellets to a degree of crystallinity of at least 30% in said pipe in 10 minutes or less.

11. The process of claim 10, comprising conducing said crystallization in 4 minutes or less.

12. The process of claim 1, wherein the pipe is devoid of mechanically rotating paddles, in-line mixers, weirs, or baffles.

13. The process of claim 1, wherein the flow of the liquid medium is in the same direction as the flow of the pellets.

14. The process of claim 1, comprising continuously separating the pellets and the liquid medium from each other.

15. The process of claim 14, wherein said liquid medium comprises water.

16. The process of claim 1, wherein said polyester polymer comprises polyethylene terephthlate.

17. The process of 16, wherein said polyethylene terephthlate comprises at least 90 ml % of terephthlate units, based on the mole percentage of diacid components.

18. The process of claim 1, comprising conducting said crystallization in four minutes or less to obtain a degree of crystallization of at least 25% at a liquid medium temperature ranging from 140° C. to 180° C.

19. The process of claim 18, further comprising continuously separating the pellets and the liquid medium from each other.

20. The process of claim 19, wherein said liquid medium comprises water.

21. The process of claim 1, further comprising a pelletizer in communication with said pipe, wherein the liquid medium circulates with a current directing the solid pellets away from said pelletizer and directly or indirectly into said pipe.

* * * * *